US012427874B2

(12) United States Patent
Mao et al.

(10) Patent No.: US 12,427,874 B2
(45) Date of Patent: Sep. 30, 2025

(54) WIRELESS CHARGING RECEIVE END WITH CURRENT CONTROL MECHANISMS

(71) Applicant: HUAWEI TECHNOLOGIES CO., LTD., Shenzhen (CN)

(72) Inventors: Yunhe Mao, Shenzhen (CN); Zhixian Wu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 674 days.

(21) Appl. No.: 17/733,447

(22) Filed: Apr. 29, 2022

(65) Prior Publication Data
US 2022/0250487 A1 Aug. 11, 2022

Related U.S. Application Data

(63) Continuation of application No. PCT/CN2020/124900, filed on Oct. 29, 2020, which
(Continued)

(30) Foreign Application Priority Data

Oct. 30, 2019 (CN) .......................... 201911048039.X

(51) Int. Cl.
*H01M 10/44* (2006.01)
*B60L 53/12* (2019.01)
(Continued)

(52) U.S. Cl.
CPC ................ *B60L 53/12* (2019.02); *H02J 7/02* (2013.01); *H02J 50/10* (2016.02); *H02J 50/80* (2016.02)

(58) Field of Classification Search
CPC .... H02J 7/02; H02J 7/00034; H02J 7/000712; H02J 50/70; H02J 50/80; B60L 2210/10; B60L 53/122; B60L 53/62; B60L 2207/20
(Continued)

(56) References Cited

U.S. PATENT DOCUMENTS 6,301,128 B1 10/2001 Jang et al.
10,243,409 B2 3/2019 Madawala et al.
(Continued)

FOREIGN PATENT DOCUMENTS

CN 103078381 A 5/2013
CN 103094995 A 5/2013
(Continued)

OTHER PUBLICATIONS

Machine translate CN107171419A (May 31, 2017) (Year: 2017).*
(Continued)

*Primary Examiner* — Edward Tso
(74) *Attorney, Agent, or Firm* — Rimon PC

(57) ABSTRACT

A wireless charging receive end, system, and control method related to the field of wireless charging technologies are provided. The wireless charging receive end includes a receiver coil, a compensation network, a power converter, and a receive end controller. The receiver coil converts an alternating magnetic field transmitted by a transmit end into an alternating current and transmits the alternating current to the compensation network. The compensation network compensates for the alternating current and then transmit a compensated alternating current to the power converter. The power converter rectifies the compensated alternating current into a direct current for charging a load. The receive end controller obtains a reference signal based on an input current of the power converter and an input reference current, and sends the reference signal to a transmit end controller.

20 Claims, 14 Drawing Sheets

Related U.S. Application Data is a continuation of application No. PCT/CN2020/091481, filed on May 21, 2020.

(51) Int. Cl.
  *H01M 10/46* (2006.01)
  *H02J 7/02* (2016.01)
  *H02J 50/10* (2016.01)
  *H02J 50/80* (2016.01)

(58) Field of Classification Search
  USPC .................................. 320/107, 108, 132, 148
  See application file for complete search history.

(56) References Cited

U.S. PATENT DOCUMENTS

| | | |
|---|---|---|
| 2017/0126064 A1 | 5/2017 | Lee |
| 2019/0023141 A1 | 1/2019 | Huang et al. |

FOREIGN PATENT DOCUMENTS

| | | |
|---|---|---|
| CN | 203967733 U | 11/2014 |
| CN | 104393623 A | 3/2015 |
| CN | 105790393 A | 7/2016 |
| CN | 105811548 A | 7/2016 |
| CN | 106787249 A | 5/2017 |
| CN | 107017706 A | 8/2017 |
| CN | 107171419 A | 9/2017 |
| CN | 107623344 A | 1/2018 |
| CN | 107839504 A | 3/2018 |
| CN | 107959334 A | 4/2018 |
| CN | 108023412 A | 5/2018 |
| CN | 108923498 A | 11/2018 |
| CN | 109245257 A | 1/2019 |
| CN | 109742863 A | 5/2019 |
| CN | 110504760 A | 11/2019 |
| CN | 110758132 A | 2/2020 |
| CN | 110808625 A | 2/2020 |
| CN | 110816321 A | 2/2020 |
| JP | 2015089187 A | 5/2015 |
| JP | 2016103947 A | 6/2016 |
| JP | 2017085784 A | 5/2017 |
| JP | 2019068509 A | 4/2019 |
| JP | 2019115149 A | 7/2019 |
| WO | 2010062198 A1 | 6/2010 |
| WO | 2020010861 A1 | 1/2020 |

OTHER PUBLICATIONS

Cui Zhibo et al, A Realization Method of Analog Current Sampling Protection Circuit for High Power Wireless Charging System, Henan Science and Technology, 2019, with an English Abstract, total 4 pages.

\* cited by examiner

WIRELESS CHARGING RECEIVE END WITH CURRENT CONTROL MECHANISMS

CROSS-REFERENCE TO RELATED APPLICATIONS

This application is a continuation of International Application No. PCT/CN2020/124900, filed on Oct. 29, 2020, which claims priority to Chinese Patent Application No. 201911048039.X, filed on Oct. 30, 2019, and International Patent Application No. PCT/CN2020/091481, filed on May 21, 2020. All of the aforementioned patent applications are hereby incorporated by reference in their entireties.

TECHNICAL FIELD

This application relates to the field of wireless charging technologies, and in particular, to a wireless charging receive end, system, and control method.

BACKGROUND

With aggravation of energy shortage and environmental pollution in the modern society, as new energy vehicles, electric vehicles have received widespread attention. An electric vehicle operates by using a vehicle-mounted power battery pack as energy.

Charging modes of the electric vehicle currently include contact charging and wireless charging. Because the wireless charging mode is easy to use and entails no spark and electric shock hazard, the wireless charging mode has become a direction of future development of electric vehicle.

The following describes a working principle of a wireless charging system with reference to FIG. 1.

FIG. 1 is a schematic diagram of a wireless charging system.

The wireless charging system includes a wireless charging transmit end (briefly referred to as a transmit end below) and a wireless charging receive end (briefly referred to as a receive end below). Typically, the transmit end is located on the ground and the receive end is located on a vehicle.

The transmit end includes an inverter H1, a transmit end compensation network 100, and a transmitter coil Lp.

For example, the inverter H1 may be a full bridge inverter. The inverter H1 may include four controllable switching transistors: S1 to S4, and the inverter H1 inverts a direct current that is output by a direct current power supply into an alternating current.

The transmit end compensation network 100 compensates for an alternating current that is output by the inverter H1 and then transmits a compensated alternating current to the transmitter coil Lp.

The transmitter coil Lp transmits, in a form of an alternating magnetic field, the alternating current for which the transmit end compensation network 100 compensates.

The receive end includes a receiver coil Ls, a receive end compensation network 200, and a power converter H2.

The receiver coil Ls receives, in a form of an alternating magnetic field, electromagnetic energy emitted by the transmitter coil Lp.

The receive end compensation network 200 compensates for an alternating current received by the receiver coil Ls and then transmits a compensated alternating current to the power converter H2.

For example, the power converter H2 may be a full bridge rectifier. The power converter H2 may include four controllable switching transistors: Q1 to Q4, and is configured to convert the alternating current for which the receive end compensation network 200 compensates into a direct current, to charge a load. The load of an electric vehicle may be a vehicle-mounted power battery pack.

The transmit end controller 101 controls a switching transistor of the inverter, and the receive end controller 201 controls a switching transistor of the rectifier.

A receive end communications module 300 performs wireless communication with a transmit end communications module 400.

During wireless charging, because an input current of the power converter at the receive end is not controlled and protected, when the input current of the power converter becomes overcurrent, the power converter may be damaged, and the reliability of the wireless charging system is affected.

SUMMARY

To resolve the foregoing technical problem, this application provides a wireless charging receive end, system, and control method, to prevent an input current of a power converter at the receive end from turning into an overcurrent, to protect the power converter at the receive end, and improve the reliability of the wireless charging system.

The wireless charging receive end provided in this application converts, through wireless induction of a receiver coil, an alternating magnetic field sent by a transmit end into a direct current for charging a load. When a wireless charging receive end and a wireless charging transmit end are implemented in the electric vehicle field, the transmit end is usually located on the ground, the receive end is usually located on a vehicle, and the receive end charges a vehicle-mounted power battery pack of the electric vehicle. In addition, the wireless charging receive end and the wireless charging transmit end may be further applied to another technical field, for example, to wirelessly charge an unmanned aerial vehicle.

According to a first aspect, this application provides a wireless charging receive end. The receive end includes a receiver coil, a compensation network, a power converter, and a receive end controller. The receiver coil is configured to: convert an alternating magnetic field transmitted by a transmit end into an alternating current and transmit the alternating current to the compensation network. The compensation network is configured to: compensate for the alternating current and then transmit a compensated alternating current to the power converter. The power converter rectifies the compensated alternating current into a direct current for charging a load. The receive end controller is configured to: obtain a reference signal at the transmit end based on an input current of the power converter and an input reference current, and send the reference signal at the transmit end to a transmit end controller, so that the transmit end controller controls the transmit end based on the reference signal at the transmit end. The reference signal at the transmit end may be a reference signal of a transmitter coil current or a reference signal of an output voltage of an inverter.

Because the wireless charging receive end controls the input current of the power converter at the receive end, the input current of the power converter at the receive end can be prevented from overcurrent, to protect the power converter at the receive end, and improve the reliability of a wireless charging system.

With reference to the first aspect, in a first example implementation, the receive end controller is configured to:

obtain a reference signal of a transmitter coil current at the transmit end based on a difference between the input current of the power converter and the input reference current, and send the reference signal of the transmitter coil current to the transmit end controller, so that the transmit end controller controls the inverter at the transmit end based on the reference signal of the transmitter coil current.

When there is a difference between the input current of the power converter and the input reference current, the difference may reflect an error condition of an input current of a rectifier. For example, the difference is a value obtained by subtracting the input current from the input reference current. When the difference is negative, that is, the input current is greater than the input reference current, the input current of the rectifier may be overcurrent. Therefore, the input current of the rectifier needs to be reduced. When the difference is positive, that is, the input current is less than the input reference current, the input current of the rectifier may be increased.

Because the transmitter coil current is proportional to the input current of the power converter, the transmitter coil current can be adjusted to control the input current. For example, when the inverter is a full bridge inverter, the transmit end controller may adjust a duty cycle of a drive signal of a controllable switching transistor, adjust a phase-shift angle between two bridge arms, or adjust both a duty cycle of a drive signal of a controllable switching transistor and a phase-shift angle between two bridge arms, to control the input current.

With reference to any one of the first aspect or the possible implementations, in a second possible implementation, the receive end controller is configured to: obtain a reference signal of an output voltage of an inverter at the transmit end based on a difference between the input current of the power converter and the input reference current, and send the reference signal of the output voltage of the inverter to the transmit end controller, so that the transmit end controller controls the inverter at the transmit end based on the reference signal of the output voltage of the inverter. The output voltage of the inverter is adjusted to adjust the input current of the power converter.

With reference to the first aspect and any one of the possible implementations, in a third possible implementation, the receive end controller is further configured to obtain the difference between the input current of the power converter and the input reference current. For example, an operational amplifier may be integrated into the receive end controller, and the operational amplifier obtains the difference between the input current of the power converter and the input reference current.

With reference to any one of the first aspect or the possible implementations, in a fourth possible implementation, the receive end further includes a first operational amplifier. A first input end of the first operational amplifier is connected to the input current of the power converter, a second input end of the first operational amplifier is connected to the input reference current, and an output end of the first operational amplifier is connected to the receive end controller. The first operational amplifier is configured to: obtain the difference between the input current of the power converter and the input reference current, and send the difference to the receive end controller. In this case, the first operational amplifier is independently disposed.

It may be understood that the foregoing functions of the first operational amplifier may be implemented by software to save hardware costs, and the software may be run by the receive end controller.

With reference to any one of the first aspect or the possible implementations, in a fifth possible implementation, the receive end controller is further configured to: obtain a drive signal of a controllable switching transistor of the power converter based on a result of comparison between a charging parameter of the load and a charging reference parameter, and drive the controllable switching transistor of the power converter based on the drive signal, where the charging parameter is any one of the following: a charging current, a charging voltage, and a charging power.

Therefore, the receive end can not only control the input current of the power converter at the receive end to prevent overcurrent, but also control the charging parameter that is output by the power converter to the load, to protect the load and improve wireless charging efficiency of the load.

With reference to any one of the first aspect or the possible implementations, in a sixth possible implementation, when the charging parameter is the charging current, the receive end controller is configured to: obtain the drive signal of the controllable switching transistor of the power converter based on a difference between an output current of the power converter and an output reference current, and drive the controllable switching transistor of the power converter based on the drive signal.

Therefore, the output current of the power converter may be controlled to be in an optimal operating range based on the output reference current, to improve charging efficiency of the load.

Input currents of power converters corresponding to different loads may be determined in advance, and the correspondence is stored in a table. In a control process, a reference value of the input current of the power converter is determined based on a coefficient of coupling between a transmitter coil and a receiver coil and a load by using a table lookup method.

Alternatively, a current combination of the transmitter coil current and the reference value of the input current of the power converter may be determined in advance, so that the current combination can meet a requirement that the input current of the power converter does not become overcurrent and the charging efficiency is optimal (higher), and the current combination is stored in a table. Therefore, in a control process, a reference value of the input current of the rectifier may be determined based on a coefficient of coupling between a transmitter coil and a receiver coil and a load by using a table lookup method, and a transmitter coil current corresponding to the input current of the rectifier may be further determined by using a table lookup method.

With reference to any one of the first aspect or the possible implementations, in a seventh possible implementation, the receive end controller is further configured to obtain the difference between the output current of the power converter and the output reference current. For example, an operational amplifier may be integrated into the receive end controller, and the operational amplifier obtains the difference between the output current of the power converter and the output reference current.

With reference to any one of the first aspect or the possible implementations, in an eighth possible implementation, the receive end controller further includes a second operational amplifier. A first input end of the second operational amplifier is connected to the output current of the power converter, a second input end of the second operational amplifier is connected to the output reference current, and an output end of the second operational amplifier is connected to the receive end controller. The second operational amplifier is configured to: obtain the difference between the output current of the power converter and the output reference current, and send the difference to the receive end controller. In this case, the second operational amplifier is independently disposed on the receive end controller.

In addition, the foregoing functions of the second operational amplifier may be further implemented by software to save hardware costs, and the software may be run by the receive end controller.

With reference to any one of the first aspect or the possible implementations, in a ninth possible implementation, the receive end controller is configured to: obtain a reference signal of a receiver coil current based on the difference between the output voltage of the power converter and the output reference voltage, obtain the drive signal of the controllable switching transistor of the power converter based on a difference between the reference signal of the receiver coil current and a sampling current of a receiver coil, and drive the controllable switching transistor of the power converter based on the drive signal.

In practice, the output voltage of the power converter may be controlled to be in an optimal operating range based on the output reference voltage, to improve charging efficiency of the load.

With reference to any one of the first aspect or the possible implementations, in a tenth possible implementation, the receive end controller is further configured to obtain the difference between the output voltage of the power converter and the output reference voltage. For example, an operational amplifier may be integrated into the receive end controller, and the operational amplifier obtains the difference between the output voltage of the power converter and the output reference voltage.

With reference to any one of the first aspect or the possible implementations, in an eleventh possible implementation, the receive end controller further includes a third operational amplifier. A first input end of the third operational amplifier is connected to the output voltage of the power converter, a second input end of the third operational amplifier is connected to the output reference voltage, and an output end of the third operational amplifier is connected to the receive end controller. The third operational amplifier is configured to: obtain the difference between the output voltage of the power converter and the output reference voltage, and send the difference to the receive end controller. In this case, the third operational amplifier is independently disposed on the receive end controller.

It may be understood that the foregoing functions of the third operational amplifier may be further implemented by software to save hardware costs, and the software may be run by the receive end controller.

With reference to any one of the first aspect or the possible implementations, in a twelfth possible implementation, the receive end controller is further configured to obtain the difference between the reference signal of the receiver coil current and the sampling current of the receiver coil.

The wireless charging receive end further controls the receiver coil current, to prevent the receiver coil from becoming overcurrent, and to improve the reliability of the receiver coil.

With reference to any one of the first aspect or the possible implementations, in a thirteenth possible implementation, the wireless charging receive end further includes a fourth operational amplifier. A first input end of the fourth operational amplifier is connected to the sampling current of the receiver coil, a second input end of the fourth operational amplifier is connected to the reference signal of the receiver coil current, and an output end of the fourth operational amplifier is connected to the receive end controller. The fourth operational amplifier is configured to: obtain the difference between the reference signal of the receiver coil current and the sampling current of the receiver coil, and send the difference to the receive end controller. In this case, the fourth operational amplifier is independently disposed at the wireless charging receive end.

It may be understood that the fourth operational amplifier may be independently disposed or may be integrated into the receive end controller. The foregoing functions of the fourth operational amplifier may be further implemented by software to save hardware costs, and the software may be run by the receive end controller.

With reference to any one of the first aspect or the possible implementations, in a fourteenth possible implementation, the power converter includes a rectifier. An input end of the rectifier is connected to an output end of the compensation network, and an output end of the rectifier is connected to the load. The rectifier may be a full bridge rectifier or a half bridge rectifier including the controllable switching transistor.

When the rectifier is the full bridge rectifier and each bridge arm includes the controllable switching transistor, the receive end controller may adjust a duty cycle of a drive signal of the controllable switching transistor, adjust a phase-shift angle between two bridge arms, or adjust both a duty cycle of a drive signal and a phase-shift angle between two bridge arms, to control the output current of the power converter.

When the rectifier is the half bridge rectifier and includes the controllable switching transistor, the receive end controller may adjust a duty cycle of a drive signal of the controllable switching transistor, to control the output current of the power converter.

With reference to any one of the first aspect or the possible implementations, in a fifteenth possible implementation, the power converter includes a rectifier and a DC-DC circuit. An input end of the rectifier is connected to an output end of the compensation network, an output end of the rectifier is connected to an input end of the DC-DC circuit, and an output end of the DC-DC circuit is connected to the load. All switching transistors in the rectifier are diodes, and the DC-DC circuit includes the controllable switching transistor.

The DC-DC circuit may be a buck (buck) circuit, a boost (boost) circuit, a buck-boost (buck-boost) circuit, or the like. This is not limited in this application.

According to a second aspect, this application further provides a wireless charging system. The system includes a transmit end and the receiving end according to any one of the first aspect or the possible implementations. The transmit end includes an inverter, a transmit end compensation network, a transmitter coil, and a transmit end controller. The inverter inverts a direct current into an alternating current and transmits the alternating current to the transmit end compensation network. The transmit end compensation network compensates for the alternating current and then transmits a compensated alternating current to the transmitter coil. The transmitter coil transmits the compensated alternating current in a form of an alternating magnetic field. The transmit end controller is configured to: receive a reference signal at a transmit end that is sent by a receive end controller, and control the transmit end based on the reference signal at the transmit end.

The transmit end may further include a power factor correction circuit. An output end of the power factor correction circuit is connected to an input end of the inverter, and the power factor correction circuit provides the inverter with a direct current voltage that can be adjusted in a specific range. Further, if a voltage range that is output by the power factor correction circuit does not meet a voltage adjustment range of an input voltage required by the inverter, a DC-DC conversion circuit may be added before the inverter to adjust an input voltage range of the inverter.

Because the receive end in the wireless charging system controls an input current of a power converter at the receive end, the input current of the power converter at the receive end can be prevented from overcurrent, to protect the power converter at the receive end, and improve the reliability of the wireless charging system.

With reference to the second aspect, in a first possible implementation, the reference signal at the transmit end is a reference signal of a transmitter coil current. The transmit end controller is configured to control the inverter based on the reference signal of the transmitter coil current.

With reference to any one of the second aspect or the foregoing implementation, in a second possible implementation, the reference signal at the transmit end is a reference signal of an output voltage of the inverter. The transmit end controller is configured to control the inverter based on the reference signal of the output voltage of the inverter.

According to a third aspect, an embodiment of this application further provides a wireless charging control method. The method is applied to a wireless charging receive end. The receive end includes a receiver coil, a receive end compensation network, a power converter, and a receive end controller. For descriptions of the receive end, refer to the foregoing implementations. The method includes: obtaining a reference signal at a transmit end based on a result of comparison between an input current of the power converter and an input reference current; and sending the reference signal at the transmit end to a transmit end controller, so that the transmit end controller controls the transmit end based on the reference signal at the transmit end. The reference signal at the transmit end may be a reference signal of a transmitter coil current or a reference signal of an output voltage of an inverter.

According to the control method, because the wireless charging receive end controls the input current of the power converter at the receive end, the input current of the power converter at the receive end can be prevented from overcurrent, to protect the power converter at the receive end, and improve the reliability of a wireless charging system.

With reference to the third aspect, in a first possible implementation, the reference signal at the transmit end is the reference signal of the transmitter coil current. The method includes: obtaining the reference signal of the transmitter coil current at the transmit end based on a difference between the input current of the power converter and the input reference current; and sending the reference signal of the transmitter coil current to the transmit end controller, so that the transmit end controller controls the inverter at the transmit end based on the reference signal of the transmitter coil current.

Because the transmitter coil current is proportional to the input current of the power converter, the transmitter coil current can be adjusted to control the input current.

With reference to any one of the third aspect or the possible implementation, in a second possible implementation, the reference signal at the transmit end is the reference signal of the output voltage of the inverter. The method includes: obtaining the reference signal of the output voltage of the inverter at the transmit end based on the difference between the input current of the power converter and the input reference current; and sending the reference signal of the output voltage of the inverter to the transmit end controller, so that the transmit end controller controls the inverter at the transmit end based on the reference signal of the output voltage of the inverter.

With reference to any one of the third aspect or the possible implementations, in a third possible implementation, when a charging parameter is a charging current, the obtaining a drive signal of a controllable switching transistor of the power converter based on a comparison between a charging parameter of a load and a charging reference parameter includes: obtaining a drive signal of a controllable switching transistor of the power converter based on a difference between an output current of the power converter and an output reference current; and driving the controllable switching transistor of the power converter based on the drive signal.

Therefore, the output current of the power converter may be controlled to be in an optimal operating range based on the output reference current, to improve the charging efficiency of the load.

With reference to any one of the third aspect or the possible implementations, in a fourth possible implementation, when a charging parameter is a charging voltage, the obtaining a drive signal of a controllable switching transistor of the power converter based on a result of comparison between a charging parameter of a load and a charging reference parameter includes: obtaining a reference signal of a receiver coil current based on a difference between an output voltage of the power converter and an output reference voltage; obtaining a drive signal of a controllable switching transistor of the power converter based on a difference between the reference signal of the receiver coil current and a sampling current of a receiver coil; and driving the controllable switching transistor of the power converter based on the drive signal.

In practice, the output voltage of the power converter may be controlled to be in an optimal operating range based on the output reference voltage, to improve the charging efficiency of the load.

This application has at least the following advantages:

The controller at the wireless charging receive end provided in this application can obtain the reference signal at the transmit end based on the result of comparison between the input current of the power converter at the receive end and the input reference current, and send the reference signal at the transmit end to the transmit end controller, so that the transmit end controller controls the transmit end based on the reference signal at the transmit end, for example, the transmit end controller can adjust the drive signal of the inverter at the transmit end to adjust the input current of the power converter at the receive end. Because the input current of the power converter at the receive end is controlled, the input current of the power converter at the receive end can be prevented from turning into overcurrent, to protect the power converter at the receive end, and improve the reliability of the wireless charging system.

DESCRIPTION OF EMBODIMENTS

To make a person skilled in the art better understand the technical solutions provided in embodiments of this application, the following first describes an application scenario of a wireless charging transmitting apparatus.

A wireless charging receive end provided in this application converts, through wireless induction of a receiver coil, an alternating magnetic field sent by a transmit end into a direct current for charging a load. When the wireless charging receive end and a wireless charging transmit end are applied to the electric vehicle field, the transmit end is located on the ground, the receive end is located on a vehicle, and the receive end charges a vehicle-mounted power battery pack of the electric vehicle.

Figure 2:
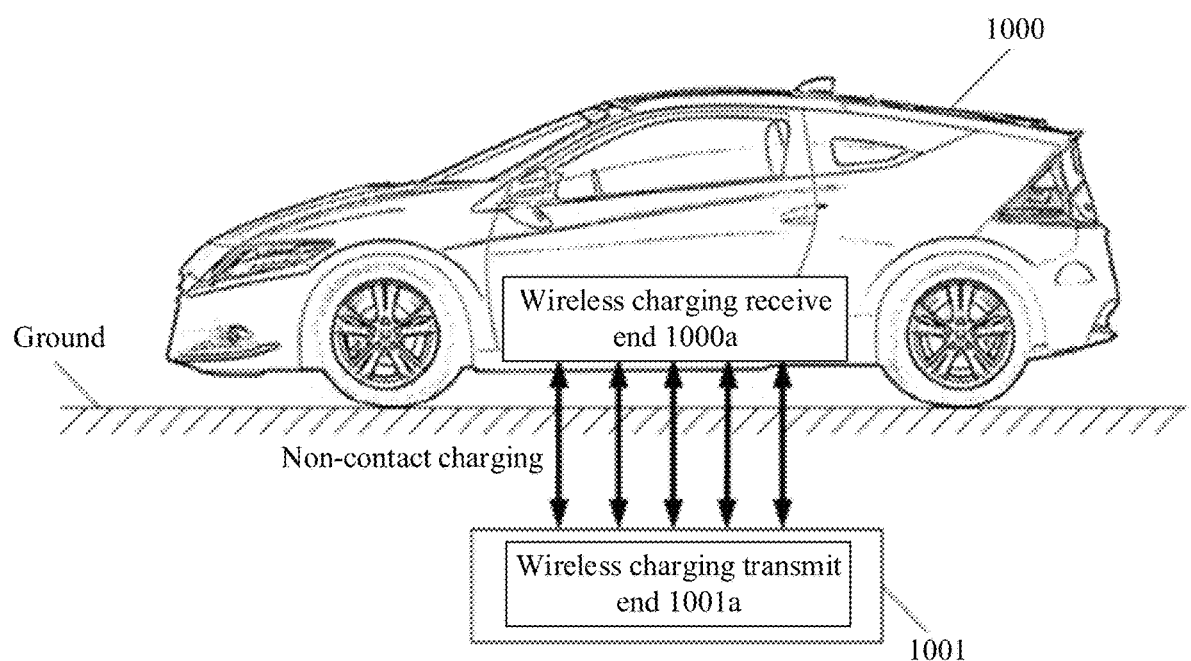
FIG. 2 is a schematic diagram of an electric vehicle wireless charging system according to an embodiment of this application.

FIG. 2 is a schematic diagram of an electric vehicle wireless charging system according to this application.

A wireless charging receive end 1000a is located on an electric vehicle 1000, and a wireless charging transmit end 1001a is located at a wireless charging station 1001 on the ground.

Currently, a charging process of the wireless charging system is that the wireless charging receive end 1000a and the wireless charging transmit end 1001a complete transfer of electric energy in a wireless form, and charge a power battery pack.

The wireless charging station 1001 may be a fixed wireless charging station, a fixed wireless charging parking space, a wireless charging road, or the like. The wireless charging transmit end 1001a may be disposed on the ground or buried under the ground (the figure shows a case in which the wireless charging transmit end 1001a is buried under the ground).

The wireless charging receive end 1000a may be integrated at a bottom of the electric vehicle 1000. When the electric vehicle 1000 enters a wireless charging range of the wireless charging transmit end 1001a, the electric vehicle 1000 may be charged in a wireless charging manner. A power receive module and a rectifier circuit at the wireless charging receive end 1000a may be integrated or separated. This is not limited in this application. When the power receive module and the rectifier circuit are separated, a rectifier in the rectifier circuit is usually placed in the vehicle.

A power transmit module and an inverter at the wireless charging transmit end 1001a may be integrated or separated. In addition, non-contact charging may be that the wireless charging receive end 1000a and the wireless charging transmit end 1001a emit energy through electric field or magnetic field coupling, which may be electric field induction, magnetic induction, magnetic resonance, or wireless radiation. This is not limited in this application. The electric vehicle 1000 and the wireless charging station 1001 may be further bidirectionally charged, that is, the wireless charging station 1001 charges the electric vehicle 1000 by using a charging power supply, and the electric vehicle 1000 may also discharge electricity into the charging power supply.

Figure 3:
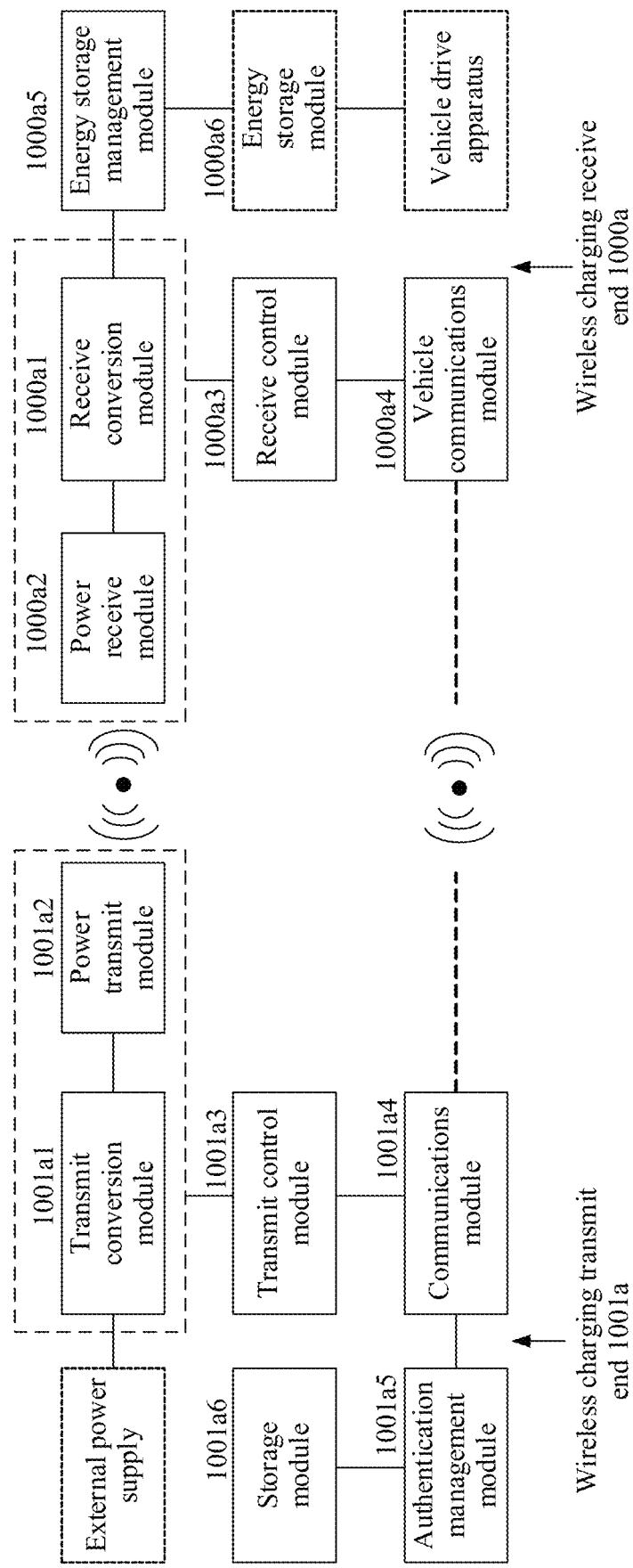
FIG. 3 is a schematic diagram of a structure of the electric vehicle wireless charging system provided in FIG. 2.

FIG. 3 a schematic diagram of a structure of the electric vehicle wireless charging system provided in FIG. 2.

The wireless charging transmit end 1001a shown in the figure includes a transmit conversion module 1001a1, a power transmit module 1001a2, a transmit control module 1001a3, a communications module 1001a4, an authentication management module 1001a5, and a storage module 1001a6.

The wireless charging receive end 1000a includes a power receive module 1000a2, a receive control module 1000a3, a receive conversion module 1000a1, a vehicle communications module 1000a4, an energy storage management module 1000a5, and an energy storage module 1000a6. In addition, the receive conversion module 1000a1 may be connected to the energy storage module 1000a6 by using the energy storage management module 1000a5, and use received energy to charge the energy storage module 1000a6, to drive the electric vehicle. The energy storage management module 1000a5 and the energy storage module 1000a6 may be located inside the wireless charging receive end 1000a or may be located outside the wireless charging receive end 1000a. This is not limited in this application. The power receive module 1000a2 includes a receiver coil.

The transmit conversion module 1001a1 may be connected to an external power supply, and convert an alternating current or a direct current obtained from the external power supply into a high-frequency alternating current. When an input of the external power supply is the alternating current, the transmit conversion module 1001a1 includes at least a power factor correction unit and an inverter. When an input of the external power supply is the direct current, the transmit conversion module 1001a1 includes at least an inverter. The power factor correction unit is configured to: make an input current phase of the wireless charging system consistent with a power grid voltage phase, reduce a harmonic content of the wireless charging system, and increase a power factor value, to reduce pollution of the wireless charging system to a power grid and improve reliability. The power factor calibration unit may further increase or decrease an output voltage of the power factor calibration unit based on a post-stage requirement. The inverter converts a voltage that is output by the power factor correction unit into a high-frequency alternating current voltage and then performs the high-frequency alternating current voltage on the power transmit module 1001a2. The high frequency alternating current voltage can improve transmission efficiency and transmission distance. The external power supply may be located inside or outside the wireless charging transmit end 1001a.

The power transmit module 1001a2 is configured to transmit, in a form of an alternating magnetic field, an alternating current that is output by the transmit conversion module 1001a1. The power transmit module 1001a2 includes a transmitter coil.

The transmit control module 1001a3 may control voltage, current, and frequency conversion parameter adjustment of the transmit conversion module 1001a1 according to an actual transmit power requirement for wireless charging, to control the voltage and current output adjustment of a high-frequency alternating current in the power transmit antenna 1001a2.

The communications module 1001a4 and the vehicle communications module 1000a4 implement wireless communication between the wireless charging transmit end 1001a and the wireless charging receive end 1000a, including power control information, fault protection information, power on/off information, mutual authentication information, and the like. The wireless charging transmit end 1001a may receive information, such as attribute information, a charging request, and mutual authentication information, that is about the electric vehicle and that is sent by the wireless charging receive end 1000a. In addition, the wireless charging transmit end 1001a may further send wireless charging transmit control information, mutual authentication information, wireless charging historical data information, and the like to the wireless charging receive end 1000a. Specifically, the manners of the foregoing wireless communication may include, but not limited to, any one or any combination of Bluetooth (Bluetooth), wireless fidelity (Wi-Fi), ZigBee (Zigbee) protocol, radio frequency identification (Radio RFID) technology, long range (Lora) wireless technology, and near field communication (NFC) technology. Further, the communications module 1001a4 may further communicate with an intelligent terminal of a user owning the electric vehicle, and the user implements remote authentication and user information transmission by using a communications function.

The authentication management module 1001a5 is configured to perform mutual authentication and authority management between the wireless charging transmit end 1001a and the electric vehicle in the wireless charging system.

The storage module 1001a6 is configured to store charging process data, mutual authentication data (for example, the mutual authentication information), and authority management data (for example, authority management information) of the wireless charging transmitting apparatus 1001a. The mutual authentication data and the authority management data may be factory settings or may be set by a user. This is not limited in this application.

The power receive module 1000a2 receives, in a form of an alternating magnetic field, electromagnetic energy emitted by the power transmit module 1001a2. A combination of structures of compensation circuits of the power transmit module 1001a2 and the power receive module 1000a2 in the wireless charging system is in a form of an S-S type, a P-P type, an S-P type, a P-S type, an LCL-LCL type, an LCL-P type, an LCC-LCC type, or the like. This is not limited in this application. The roles of the wireless charging transmit end 1001a and the wireless charging receive end 1000a are interchangeable, that is, the wireless charging receive end 1000a may also charge the wireless charging transmit end 1001a in turn.

The receive conversion module 1000a1 converts the electromagnetic energy received by the power receive module 1000a2 into a direct current required for charging the energy storage module 1000a6. The receive conversion module 1000a1 includes at least a compensation circuit and a rectifier. The rectifier converts a high-frequency resonant current and voltage received by the power receive module into a direct current.

The receive control module 1000a3 can adjust parameters such as a voltage, a current, and a frequency of the receive conversion module 1000a1 based on an actual wireless charging receiving power requirement.

When wireless charging is performed, because the transmit end and the receive end may be from different manufacturers, for example, transmit apparatuses installed in a public parking space need to interoperate with receive apparatuses of different vehicle models and different power levels, control on the power transmit apparatus and the power receive apparatus needs to be decoupled as much as possible, to implement basic control on an operation of the wireless charging system. However, because the input current of the power converter at the receive end is not controlled and protected, the input current of the power converter may become overcurrent, the power converter may be damaged, and the reliability of the wireless charging system is reduced.

To resolve the foregoing technical problem, this application provides a wireless charging receive end, system, and control method. A controller at the wireless charging receive end can obtain a reference signal at a transmit end based on a comparison between an input current of a power converter at the receive end and an input reference current, and send the reference signal at the transmit end to a transmit end controller, so that the transmit end controller controls the transmit end based on the reference signal. Because the input current of the power converter at the receive end is controlled, the input current of the power converter at the receive end can be prevented from overcurrent, to protect the power converter at the receive end, and to improve reliability of the wireless charging system.

To make a person skilled in the art understand the technical solutions in this application better, the following describes the technical solutions in embodiments of this application with reference to accompanying drawings in embodiments of this application. It may be understood that terms such as "first" and "second" in the following embodiments are merely for ease of description, and do not constitute a limitation on this application.

Embodiment 1 of a Receive End

An embodiment of this application provides a wireless charging receive end, which is described below in detail with reference to accompanying drawings.

Figure 4:
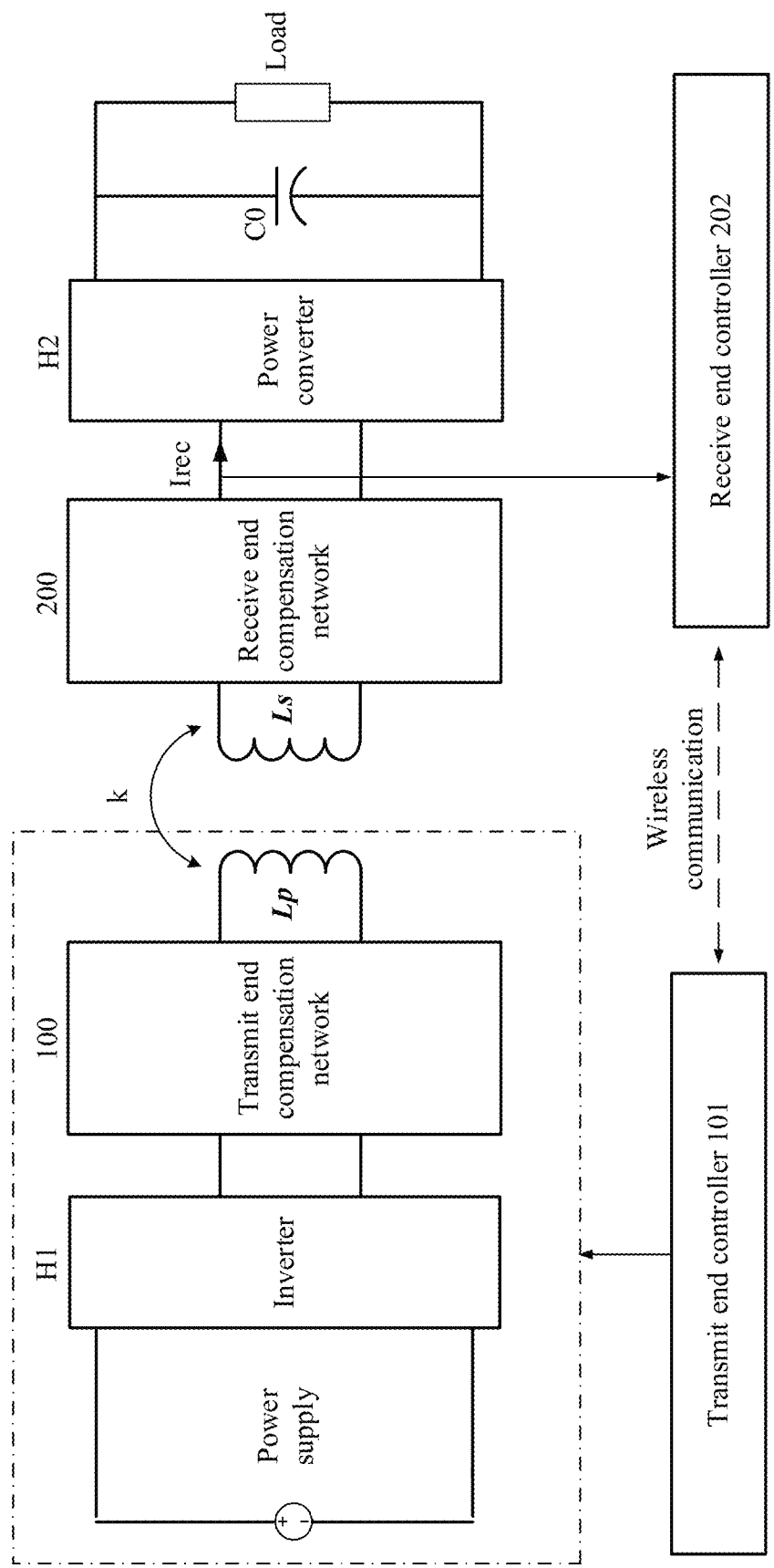
FIG. 4 is a schematic diagram of a system corresponding to a wireless charging receive end according to an embodiment of this application.

FIG. 4 is a schematic diagram of a system corresponding to a wireless charging receive end according to an embodiment of this application.

Figure 1:
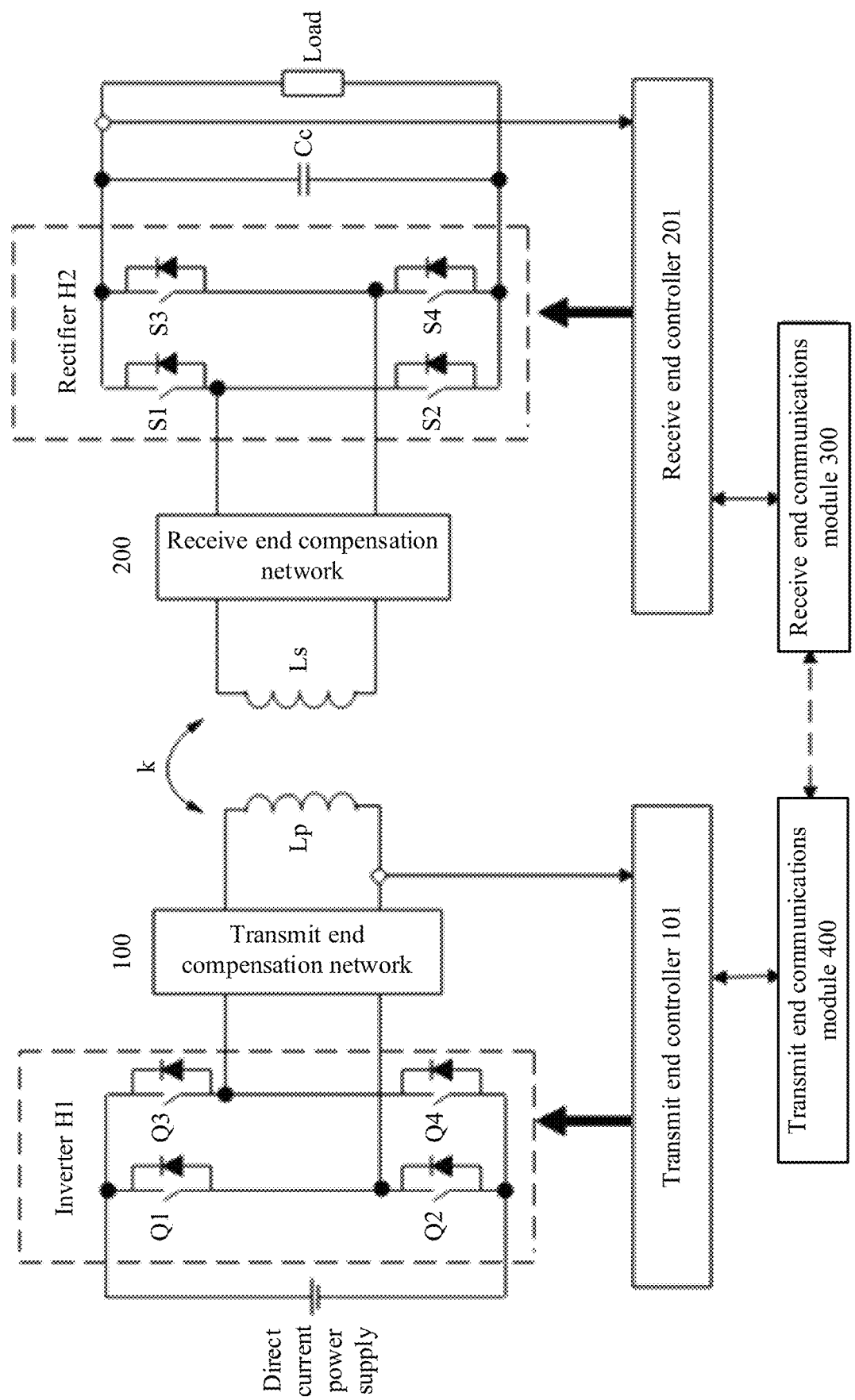
FIG. 1 is a schematic diagram of a wireless charging system.

A wireless charging transmit end includes an inverter H1, a transmit end compensation network 100, and a transmitter coil Lp. For descriptions of the transmit end, refer to descriptions corresponding to FIG. 1. Details are not described herein again.

The wireless charging receive end includes a receiver coil Ls, a receive end compensation network 200 (which is briefly referred to as a compensation network 200 below), a power converter H2, and a receive end controller 202.

The receiver coil Ls is configured to: convert an alternating magnetic field transmitted by a transmit end into an alternating current and transmit the alternating current to the compensation network 200.

The compensation network 200 compensates for the alternating current and then transmits a compensated alternating current to the power converter H2.

The power converter H2 rectifies the compensated alternating current into a direct current and supplies the direct current to a load.

The receive end controller 202 obtains a reference signal at the transmit end based on a comparison between an input current Irec of the power converter H2 and an input reference current, and sends the reference signal at the transmit end to a transmit end controller 101, so that the transmit end controller 101 controls the transmit end based on the reference signal at the transmit end.

The receive end controller 202 may obtain the input current Irec of the power converter H2 by using a current sensor.

In a possible implementation, a fixed value may be used as the input reference current, to ensure that an input current of a rectifier does not exceed a maximum designed value of the input current of the power converter H2 in all working conditions, to ensure that the input current of the power converter is never overcurrent.

In another possible implementation, an optimal value (or a relatively optimal value) of the input current of the power converter H2 in various working conditions may be determined in advance and used as the input reference current, for example, an optimal (or relatively optimal) input reference current of a corresponding power converter H2 in a same load, or an optimal (or relatively optimal) input reference current of a corresponding power converter H2 in different loads when coefficients of coupling between a transmitter coil and a receiver coil are different. A basis for determining the input reference current may be ensuring that the input current of the power converter H2 is not overcurrent and a requirement for charging efficiency at the receive end is met, that is, the highest or a relatively high charging efficiency is achieved.

The reference signal at the transmit end may be a reference signal of a transmitter coil current or a reference signal of an output voltage of an inverter H1. This is not limited in this application.

In an actual application, the transmit end controller 101 may adjust a drive signal of the inverter H1 at the transmit end based on the reference signal, to adjust the input current of the power converter H1 at the receive end. For example, when the inverter H1 includes a controllable switching transistor, the transmit end controller 101 may adjust, based on the reference signal at the transmit end, a drive signal sent to the controllable switching transistor of the inverter H1. The drive signal may be a PWM (pulse width modulation) signal.

It may be understood that the transmit end controller 101 is the transmit control module 1001a3 in FIG. 3 and the receive end controller 202 is the receive control module 1000a3 in FIG. 3.

The receive end controller provided in some embodiments of this application can obtain the reference signal at the transmit end based on the result of comparison between the input current of the power converter and the input reference current, and send the reference signal at the transmit end to the transmit end controller, so that the transmit end controller controls the transmit end based on the reference signal at the transmit end. Because the input current of the power converter at the receive end is controlled, the input current of the power converter at the receive end can be prevented from overcurrent, to protect the power converter at the receive end, and improve reliability of the wireless charging system.

The following describes working principles of the receive end controller and the transmit end controller with reference to specific structures of the inverter and the power converter.

The receive end controller obtains a reference signal at a transmit end based on a result of comparison between an input current Irec of a power converter H2 and an input reference current. The reference signal at the transmit end may be a reference signal of a transmitter coil current or a reference signal of an output voltage of an inverter H1.

When there is a difference between the input current Irec of the power converter H2 and the input reference current, the difference may reflect an error condition of an input current of a rectifier. For example, the difference is a value obtained by subtracting Irec from the input reference current. When the difference is negative, that is, Irec is greater than the input reference current, the input current of the rectifier may be overcurrent. Therefore, the input current of the rectifier needs to be reduced. When the difference is positive, that is, Irec is less than the input reference current, the input current of the rectifier may be increased.

Irec is obtained after a receive end compensation network 200 compensates for a receiver coil current. Because the transmitter coil current is proportional to the input current of the power converter H2, the transmitter coil current can be adjusted to control Irec. Descriptions are provided in detail below.

A working principle used when the reference signal at the transmit end is a reference signal of a transmitter coil current is first described in the following sections.

Embodiment 2 of a Receive End

Figure 5:
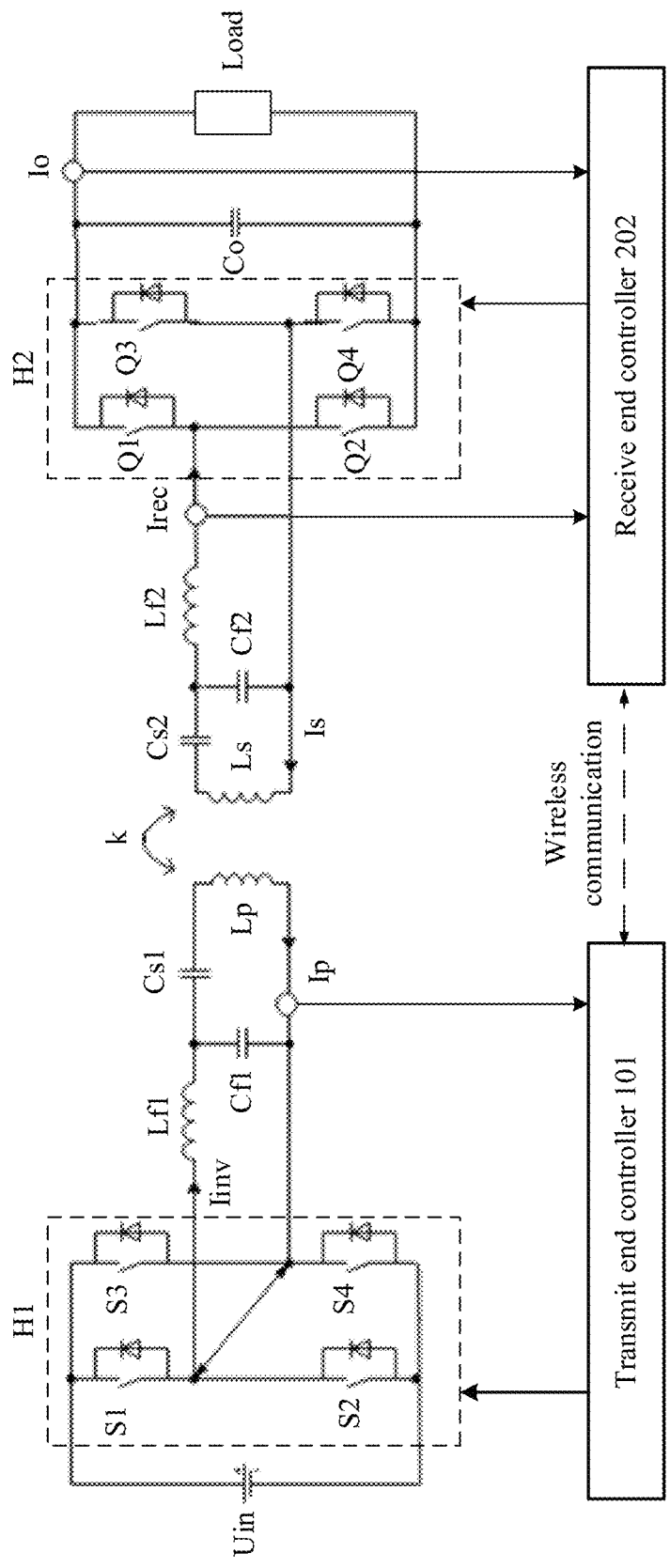
FIG. 5 is a schematic diagram of a system corresponding to another wireless charging receive end according to an embodiment of this application.

FIG. 5 is a schematic diagram of a system corresponding to another wireless charging receive end according to an embodiment of this application.

The inverter H1 is a full bridge inverter, and includes controllable switching transistors S1 to S4. The power converter H2 is a full bridge rectifier, and includes controllable switching transistors Q1 to Q4.

An inductor Lf1, a capacitor Cf1, and a capacitor Cs1 form a transmit end compensation network.

An inductor Lf2, a capacitor Cf2, and a capacitor Cs2 form a receive end compensation network.

The receive end further includes an output filtering capacitor Co and a load.

The receive end controller 202 obtains a reference signal (represented by Ipref below) of a transmitter coil current at the transmit end based on a difference between an input current Irec of the power converter H2 and an input reference current, and sends the reference signal Ipref of the transmitter coil current to a transmit end controller 101, so that the transmit end controller 101 controls the inverter H1 at the transmit end based on Ipref. Descriptions are provided in detail below.

The receive end controller 202 may obtain the input current Irec of the power converter H2 by using a current sensor.

In a possible implementation, to obtain the difference between Irec and the input reference current, the receive end may further include a first operational amplifier, where a first input end of the first operational amplifier is connected to the input current Irec of the power converter H1, a second input end of the first operational amplifier is connected to the input reference current, and an output end of the first operational amplifier is connected to the receive end controller 202.

The first operational amplifier can obtain the difference between Irec and the input reference current, and send the difference to the receive end controller 202.

It may be understood that, the first operational amplifier may be independently disposed or may be integrated into the receive end controller 202. This is not limited in this application.

In another possible implementation, the foregoing functions of the first operational amplifier may be implemented by software to save hardware costs, and the software may be run by the receive end controller 202. To be specific, the receive end controller 202 can obtain the difference between Irec and the input reference current.

The receive end controller 202 performs compensation control on the obtained difference to generate the reference signal Ipref of the transmitter coil current. Compensation control may be any compensation control method such as PID control (where P represents proportion (Proportion), I represents integration (Integration), and D represents differentiation (Differentiation)), hysteresis control, fuzzy control, sliding mode control, or chaos control. This is not limited in this application. In addition, the foregoing compensation control method is also applicable to compensation control in the following descriptions. Details are not described below again.

The receive end controller 202 sends the reference signal Ipref of the transmitter coil current to the transmit end controller 101, so that the transmit end controller 101 controls the inverter H1 at the transmit end based on Ipref.

The following describes a working principle of the transmit end controller 101 in detail.

The transmit end controller 101 may sample a transmitter coil current by using a current sensor, where the sampled current is Ip.

The transmit end may further include a transmit end operational amplifier, where a first input end of the transmit end operational amplifier is connected to Ip, a second input end of the transmit end operational amplifier is connected to Ipref, and an output end of the transmit end operational amplifier is connected to the transmit end controller 101.

The transmit end operational amplifier can obtain a difference (represented by Iperr below) between Ip and Ipref, and send the difference to the transmit end controller 101.

It may be understood that, the transmit end operational amplifier may be independently disposed or may be integrated into the transmit end controller 101. This is not limited in this application. In addition, the foregoing functions of the transmit end operational amplifier may be further implemented by software to save hardware costs, and the software may be run by the transmit end controller 101.

The transmit end controller 101 performs compensation control on the difference Iperr to generate a modulation signal of an inverter H1, generates a drive signal of the inverter H1 through modulation, and drives a controllable switching transistor of the inverter H1 based on the drive signal.

Specifically, when the inverter H1 is a full bridge inverter, the transmit end controller may adjust a duty cycle of a drive signal of a controllable switching transistor, adjust a phase-shift angle between two bridge arms, or adjust both a duty cycle of a drive signal of a controllable switching transistor and a phase-shift angle between two bridge arms.

In a possible implementation, input currents of power converters corresponding to different loads may be determined in advance, and the correspondence is stored in a table. In a control process, a reference value of the input current of the power converter is determined based on a coefficient of coupling between a transmitter coil and a receiver coil and a load by using a table lookup method. Alternatively, a current combination of the transmitter coil current and the reference value of the input current of the power converter may be determined in advance, where the current combination can meet a requirement that the input current of the power converter is not overcurrent and charging efficiency is optimal (higher), and the current combination is stored in a table. Therefore, in a control process, a reference value of the input current of the rectifier may be determined based on a coefficient of coupling between a transmitter coil and a receiver coil and a load by using a table lookup method, and a transmitter coil current corresponding to the input current of the rectifier may be further determined by using a table lookup method.

In conclusion, a controller at the wireless charging receive end can obtain the reference signal of the transmitter coil current based on a comparison between the input current of the power converter at the receive end and the input reference current, and send the reference signal of the transmitter coil current to the transmit end controller, so that the transmit end controller controls the transmit end based on the reference signal of the transmitter coil current. Because the input current of the power converter at the receive end is controlled, the input current of the power converter at the receive end can be prevented from overcurrent, to protect the power converter at the receive end, and improve reliability of the wireless charging system. In addition, in actual application, the input reference current may be adjusted in real time based on a coefficient of coupling between a transmitter coil and a receiver coil and a load status, so that the power converter can adapt to different working conditions. Therefore, an output response speed of a wireless charging system can be further improved.

Further, in a possible implementation, the input current of the power converter at the receive end needs to be controlled not to overcurrent, and a charging parameter that is output by the power converter to a load further needs to be controlled to protect the load and improve wireless charging efficiency of the load. The charging parameter may be any one of a charging current, a charging voltage, and a charging power.

The receive end controller 202 may obtain a drive signal of a controllable switching transistor of the power converter H2 based on a result of comparison between a charging parameter of the load and a charging reference parameter, and drive the controllable switching transistor of the power converter H2 based on the drive signal.

Descriptions are provided below by using an example in which the charging parameter is the charging current. It may be understood that a control principle is similar to that used when the charging parameter is the charging voltage. When the charging parameter is the charging power, the charging power may be determined based on a product of the charging current and the charging voltage. Details are not described again.

The receive end controller 202 may obtain an output current Io of the power converter H2 by using a current sensor.

When receiving a charging instruction, the receive end controller 202 obtains an output reference current included in the charging instruction. When the charging parameter is the charging voltage, the receive end controller 202 obtains an output reference voltage included in the charging instruction. When the charging parameter is the charging power, the receive end controller 202 obtains an output reference power included in the charging instruction.

The charging instruction may be sent by a transmit end, or may be sent by a receive end. When the charging instruction is sent from the transmit end, the charging instruction may be an instruction delivered by the transmit end in response to a user operation. When the charging instruction is sent from the receive end, the charging instruction may be an instruction delivered by the receive end in response to a user operation, or an instruction delivered by a BMS (battery management system) connected to a load.

The receive end controller 202 obtains a difference Ioerr between the output current Io of the power converter H2 and the output reference current.

In a possible implementation, to obtain the difference Ioerr, the receive end may further include a second operational amplifier, where a first input end of the second operational amplifier is connected to the output current Io, a second input end of the second operational amplifier is connected to the output reference current, and an output end of the second operational amplifier is connected to the receive end controller 202.

The second operational amplifier can obtain the difference Ioerr, and send the difference Ioerr to the receive end controller 202.

It may be understood that, the second operational amplifier may be independently disposed or may be integrated into the receive end controller 202. This is not limited in this application.

In another possible implementation, the foregoing functions of the second operational amplifier may be implemented by software to save hardware costs, and the software may be run by the receive end controller 202. To be specific, the receive end controller 202 can obtain the difference Ioerr between Io and the output reference current of the power converter H2.

The receive end controller 202 may perform compensation control on the difference Ioerr to generate a modulation signal of the power converter H2, generate a drive signal of the power converter H2 through modulation, and drive a controllable switching transistor of the power converter H2 based on the drive signal.

Figure 6:
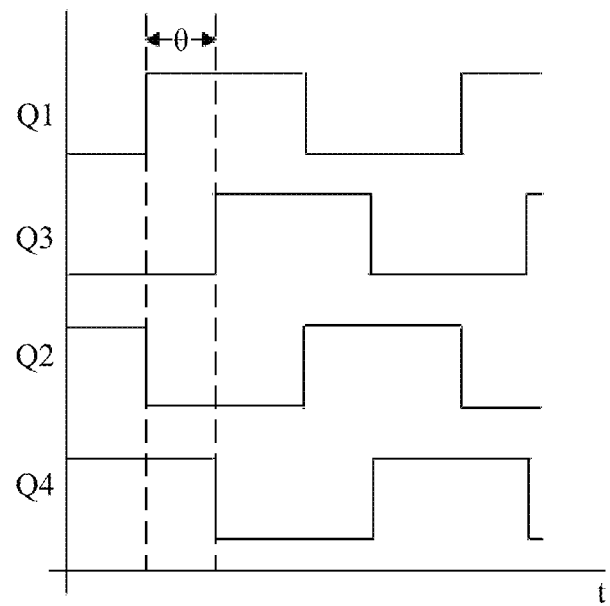
FIG. 6 is a schematic diagram of a driving time sequence of a power converter shown in FIG. 5.

FIG. 6 is a schematic diagram of a driving time sequence of the power converter H2 shown in FIG. 5.

When the power converter H2 performs phase shift control, an upper switch and a down switch of a same bridge arm are connected to each other. A relationship between a phase-shift angle θ between switching transistors (which are a same upper switch or a same down switch) of a leading bridge arm and a lagging bridge arm at a same location, an input current Irec of the power converter H2, and an output current Io is as follows:

$$I_o = I_{rec} \cdot \sin\frac{\theta}{2} \quad (1)$$

It can be learned from the relationship shown in Formula (1) that the receive end controller 202 may adjust the input current Irec of the rectifier and adjust the phase-shift angle θ between the leading bridge arm and the lagging bridge arm of the power converter H2, to control the output current Io. For descriptions of adjusting the input current Irec by the receive end controller 202, refer to the foregoing descriptions. The following describes a working principle of adjusting the phase-shift angle θ by the receive end controller 202.

In a possible implementation, for example, the receive end performs negative feedback adjustment. A difference Ioerr is obtained by subtracting the output current Io of the power converter H2 from an output reference current. When Ioerr is negative, that is, the output current Io is greater than the output reference current of the power converter H2, a drive signal generated by the receive end controller 202 may be used to control the phase-shift angle to decrease, to reduce the output current of the power converter H2. When Ioerr is positive, that is, the output current Io is less than the output reference current of the power converter H2, a drive signal generated by the receive end controller 202 may be used to control the phase-shift angle to increase, to increase the output current of the power converter H2.

In addition, the receive end controller 202 may also adjust a duty cycle of a drive signal, to adjust the output current of the power converter H2. Descriptions are provided in detail below.

When the difference Ioerr is negative, that is, the output current Io is greater than the output reference current of the power converter H2, the receive end controller 202 may reduce the duty cycle of the drive signal, to reduce the output current of the power converter H2. When Ioerr is positive, that is, the output current Io is less than the output reference current of the power converter H2, the receive end controller 202 may increase the duty cycle of the drive signal, to increase the output current of the power converter H2.

In a possible implementation, the receive end controller 202 may also adjust both the duty cycle of the drive signal and the phase-shift angle, to control the output current of the power converter H2.

The output current of the power converter H2 is controlled to ensure that the load is not overcurrent, and in practice, the output current of the power converter H2 may be further controlled to be in an optimal operating range based on the output reference current, to improve charging efficiency of the load.

In conclusion, the wireless charging receive end provided in some embodiments of this application can not only prevent the input current of the power converter at the receive end from overcurrent, but also protect the load and improve wireless charging efficiency of the load based on a charging reference parameter and the charging parameter of the power converter, to further improve reliability of the wireless charging system.

Further, in FIG. 5, descriptions are provided by using an example in which the power converter H2 is a full bridge rectifier. In a possible implementation, the power converter H2 may also be implemented in another manner. Descriptions are provided in detail below. It may be understood that the principle of controlling the input current of the power converter not to overcurrent is similar to that in the following implementations. Details are not described below again.

Figure 7A:
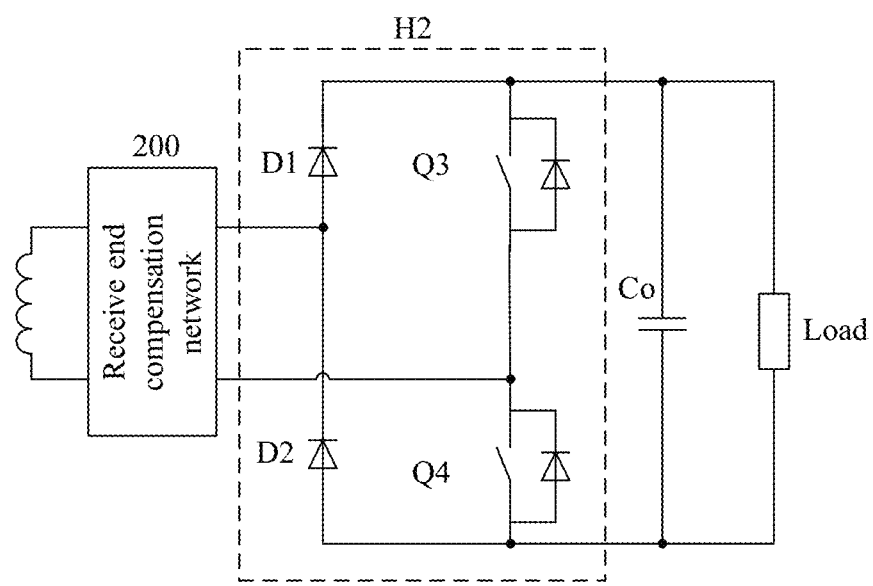
FIG. 7(a) is a schematic diagram of a power converter according to an embodiment of this application.

Manner 1:

FIG. 7(a) is a schematic diagram of a power converter according to an embodiment of this application.

The power converter H2 is a full bridge rectifier, one bridge arm includes uncontrollable diodes D1 and D2, and the other bridge arm includes controllable switching transistors Q3 and Q4.

A receive end controller may adjust duty cycles of drive signals of Q3 and Q4, adjust a phase-shift angle between two bridge arms, or adjust both duty cycles of drive signals of Q3 and Q4 and a phase-shift angle between two bridge arms, to control an output current of the power converter H2.

Figure 7B:
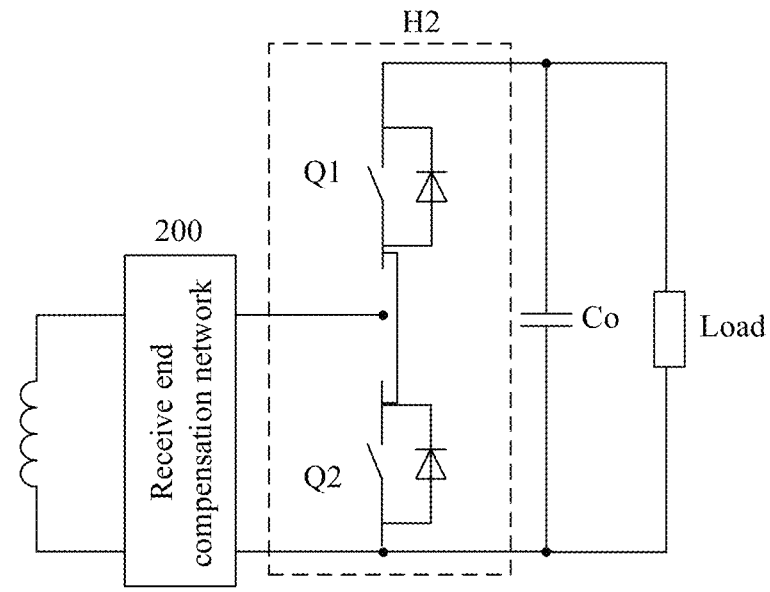
FIG. 7(b) is a schematic diagram of another power converter according to an embodiment of this application.

Manner 2:

FIG. 7(b) is a schematic diagram of another power converter according to an embodiment of this application.

The power converter H2 is a half bridge rectifier, that is, it includes only one bridge arm, and the bridge arm includes controllable switching transistors Q1 and Q2.

In this case, a receive end controller may adjust duty cycles of drive signals of Q1 and Q2, to control an output current of the power converter H2.

Figure 7C:
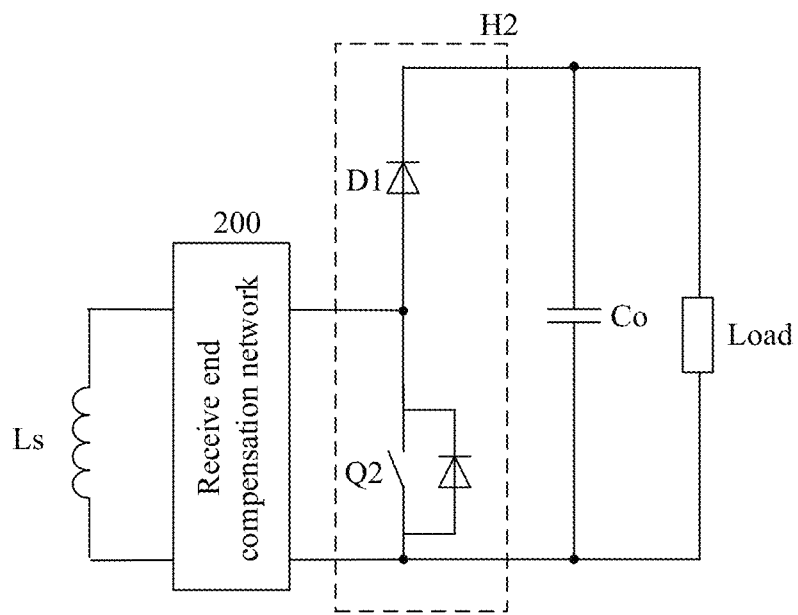
FIG. 7(c) is a schematic diagram of still another power converter according to an embodiment of this application.

Manner 3:

FIG. 7(c) is a schematic diagram of still another power converter according to an embodiment of this application.

The power converter H2 is a half bridge rectifier, that is, includes only one bridge arm, an upper half bridge arm of the bridge arm includes a diode D1, and a lower half bridge arm includes a controllable switching transistor Q2.

In this case, a receive end controller may adjust a duty cycle of a drive signal of Q2, to control an output current of the power converter H2.

Figure 7D:
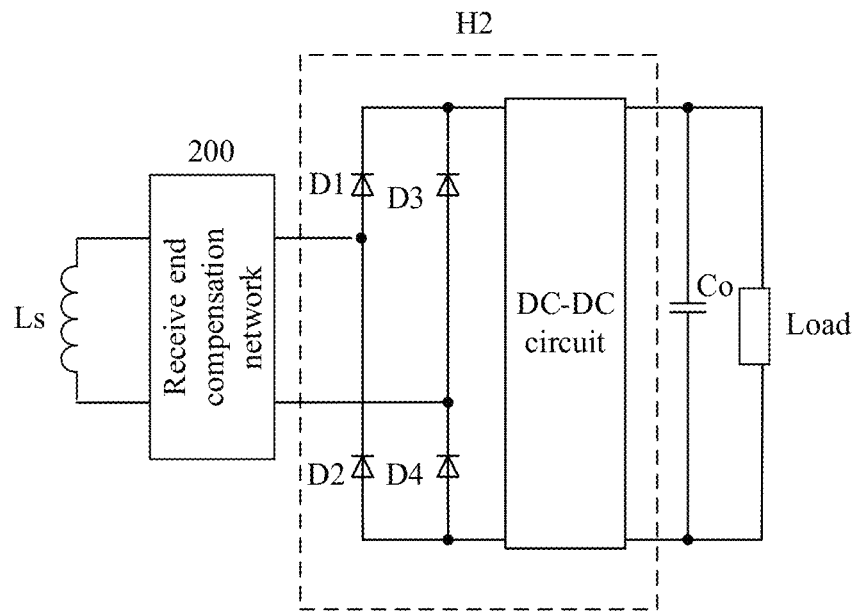
FIG. 7(d) is a schematic diagram of yet another power converter according to an embodiment of this application.

Manner 4:

FIG. 7(d) is a schematic diagram of yet another power converter according to an embodiment of this application.

The power converter H2 includes a rectifier and a DC-DC circuit. An output end of the rectifier is connected to an input end of the DC-DC circuit, and an output end of the DC-DC circuit is connected to a load.

The rectifier may be an uncontrollable diode rectifier bridge, and includes diodes DI to D4. The DC-DC circuit may be a buck (buck) circuit, a boost (boost) circuit, a buck-boost (buck-boost) circuit, or the like. This is not limited in this application.

In this case, a receive end controller may control a working status of the DC-DC circuit, to control an output current of the power converter H2.

Descriptions are provided below by using an example in which the DC-DC circuit is the boost circuit.

Figure 7E:
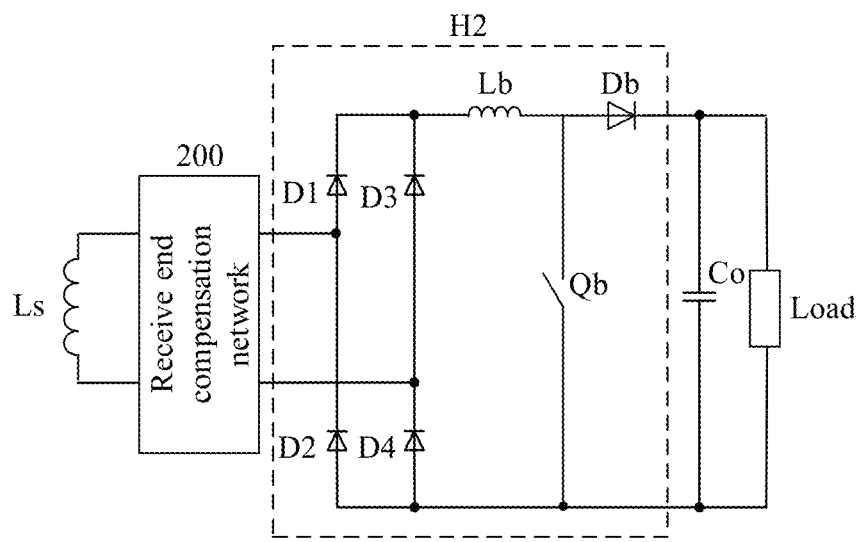
FIG. 7(e) is a schematic diagram of still yet another power converter according to an embodiment of this application.

FIG. 7(e) is a schematic diagram of still yet another power converter according to an embodiment of this application.

The DC-DC circuit includes an inductor Lb, a diode Db, and a switching transistor Qb. A receive end controller 202 may adjust a duty cycle of a drive signal of the switching transistor Qb, to control an output current of the power converter H2.

Figure 7F:
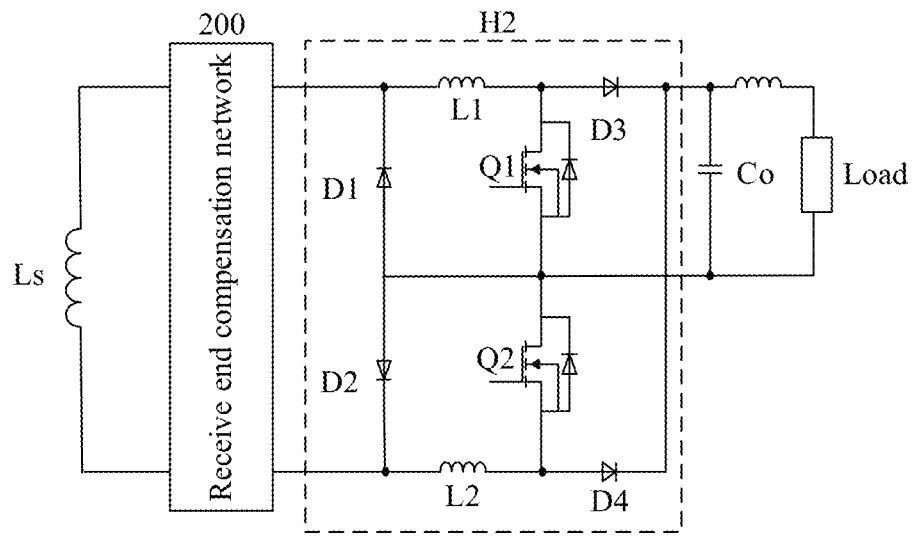
FIG. 7(f) is a schematic diagram of still yet another power converter according to an embodiment of this application.

Manner 5:

FIG. 7(f) is a schematic diagram of still yet another power converter according to an embodiment of this application.

The power converter includes two boost circuits in parallel, one of the boost circuits includes L1, Q1, and D3, and the other boost circuit includes L2, Q2, and D4. A receive end controller 202 may adjust duty cycles of drive signals of the switching transistors Q1 and Q2, to control an output current of the power converter H2.

Further, in FIG. 5, descriptions are provided by using an example in which the inverter H1 is a full bridge inverter. In actual application, the inverter H1 may also be implemented in another manner. Descriptions are provided in detail below.

Figure 8A:
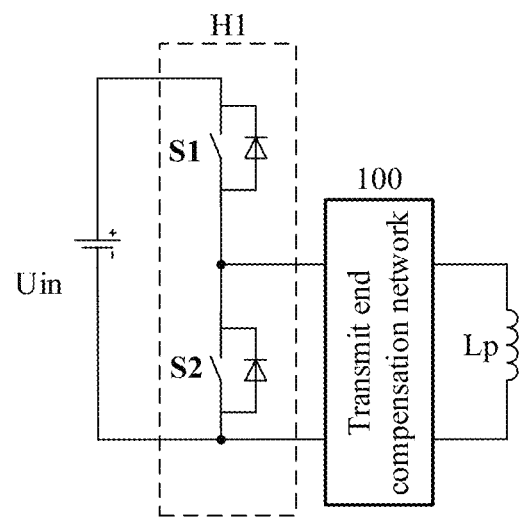
FIG. 8(a) is a schematic diagram of an inverter according to an embodiment of this application.

FIG. 8(a) is a schematic diagram of an inverter according to an embodiment of this application.

The inverter H1 is a half bridge inverter, and both an upper half bridge arm and a lower half bridge arm of the inverter H1 include controllable switching transistors: S1 and S2.

A transmit end controller may adjust duty cycles of drive signals of S1 and S2 and a phase-shift angle between two bridge arms, to control a transmitter coil current.

In addition, a wireless charging transmit end may also be implemented in different manners. Descriptions are provided in detail below.

Figure 8B:
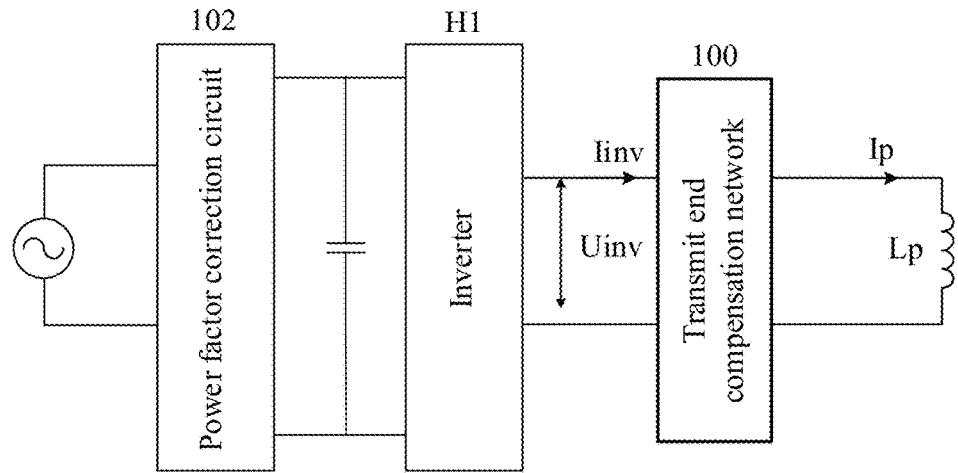
FIG. 8(b) is a schematic diagram of a transmit end corresponding to an inverter according to an embodiment of this application.

FIG. 8(b) is a schematic diagram of a transmit end corresponding to an inverter according to an embodiment of this application.

The power factor correction circuit 102 is a single-phase power factor correction circuit. An output end of the power factor correction circuit 102 is connected to an input end of the inverter H1, and the power factor correction circuit 102 provides the inverter H1 with a direct current voltage that can be adjusted in a specific range.

Figure 8C:
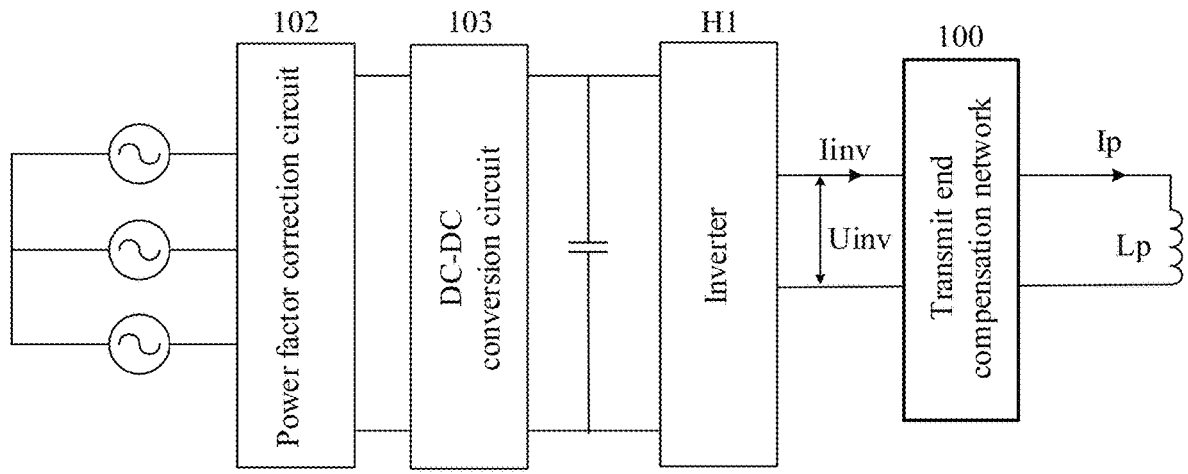
FIG. 8(c) is a schematic diagram of a transmit end corresponding to another inverter according to an embodiment of this application.

FIG. 8(c) is a schematic diagram of a transmit end corresponding to another inverter according to an embodiment of this application.

The power factor correction circuit 102 is a three-phase power factor correction circuit. If a voltage range that is output by the power factor correction circuit 102 does not meet a voltage adjustment range of an input voltage required by the inverter H1, a DC-DC conversion circuit 103 may be added before the inverter H1 to adjust an input voltage range of the inverter H1.

Further, the transmit end compensation network in FIG. 5 includes an inductor Lf1, a capacitor Cf1, and a capacitor Cs1, and is an LCC-type compensation network. In an example implementation, the transmit end compensation network may also be implemented in another manner. Descriptions are provided in detail below.

Figure 9A:
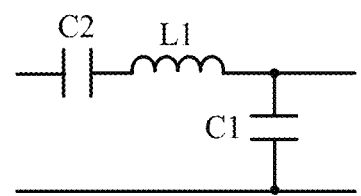
FIG. 9(a) is a schematic diagram of a transmit end compensation network according to an embodiment of this application.

Manner 1:

FIG. 9(a) is a schematic diagram of a transmit end compensation network according to an embodiment of this application.

The compensation network includes a capacitor C2, an inductor L1, and a capacitor C1, and is an LCC-type compensation network.

Figure 9B:
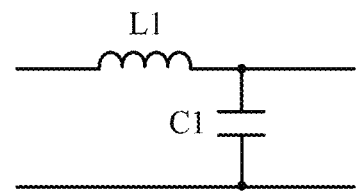
FIG. 9(b) is a schematic diagram of another transmit end compensation network according to an embodiment of this application.

Manner 2:

FIG. 9(b) is a schematic diagram of another transmit end compensation network according to an embodiment of this application.

The compensation network includes an inductor L1 and a capacitor C1, and is an LC-type compensation network.

Figure 9C:
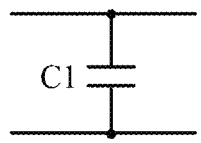
FIG. 9(c) is a schematic diagram of still another transmit end compensation network according to an embodiment of this application.

Manner 3:

FIG. 9(c) is a schematic diagram of still another transmit end compensation network according to an embodiment of this application.

The compensation network includes a capacitor C1, and is a P-type compensation network.

The transmit end compensation network may also be applied to a receive end compensation network correspondingly, and the transmit end compensation network and the receive end compensation network may be the same or different, for example, may be a combination such as LCC-LCC, LCC-LC, LC-LCC, LC-LC, LCC-P, P-LCC, P-P, LC-P, and P-LC.

The following describes a working principle when the reference signal at the transmit end is a reference signal of an output voltage of the inverter H1.

Embodiment 3 of a Receive End

Figure 10:
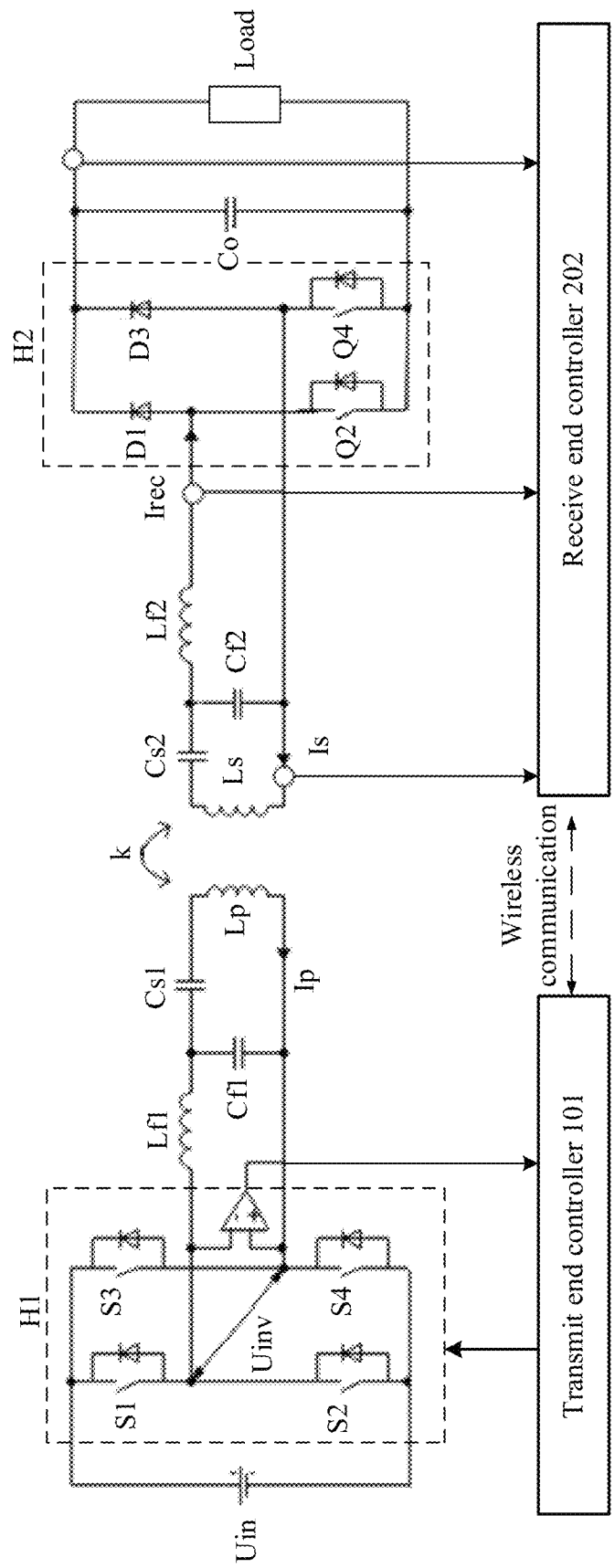
FIG. 10 is a schematic diagram of a system corresponding to still another wireless charging receive end according to an embodiment of this application.

FIG. 10 is a schematic diagram of a system corresponding to still another wireless charging receive end according to an embodiment of this application.

The inverter H1 is a full bridge inverter, and includes controllable switching transistors S1 to S4.

The power converter H2 is a full bridge rectifier, both upper half bridge arms of two bridge arms include diodes: D1 and D3, and both lower half bridge arms of the two bridge arms include controllable switching transistors: Q2 and Q4. A drive signal of the receive end controller H2 is used to control the controllable switching transistors Q2 and Q4.

An inductor Lf1, a capacitor Cf1, and a capacitor Cs1 form a transmit end compensation network.

An inductor Lf2, a capacitor Cf2, and a capacitor Cs2 form a receive end compensation network.

The receive end further includes an output filtering capacitor Co and a load.

The receive end controller 202 obtains a reference signal (represented by Uinvref below) of an output voltage of the inverter at the transmit end based on a difference between an input current Irec of the power converter H2 and an input reference current, and sends Uinvref to a transmit end controller 101, so that the transmit end controller 101 controls the inverter H1 at the transmit end based on Uinvref. Descriptions are provided in detail below.

The receive end controller 202 may obtain the input current Irec of the power converter H2 by using a current sensor.

In a possible implementation, to obtain a difference between Irec and the input reference current, the receive end may further include a first operational amplifier, where a first input end of the first operational amplifier is connected to the input current Irec of the power converter H1, a second input end of the first operational amplifier is connected to the input reference current, and an output end of the first operational amplifier is connected to the receive end controller 202.

The first operational amplifier can obtain the difference between Irec and the input reference current, and send the difference to the receive end controller 202.

It may be understood that the first operational amplifier may be independently disposed or may be integrated into the receive end controller 202. This is not limited in this application.

In another possible implementation, the foregoing functions of the first operational amplifier may be implemented by software to save hardware costs, and the software may be run by the receive end controller 202.

The receive end controller 202 performs compensation control on the obtained difference to generate a reference signal Uinvref of an output voltage of an inverter, and sends Uinvref to the transmit end controller 101.

The following describes a working principle of the transmit end controller 101 in detail.

The transmit end controller 101 may sample an output voltage Uinv of the inverter H1 by using a voltage sensor.

The transmit end may further include a transmit end operational amplifier, where a first input end of the transmit end operational amplifier is connected to Uinvref, a second input end of the transmit end operational amplifier is connected to Uinv, and an output end of the transmit end operational amplifier is connected to the transmit end controller 101.

The transmit end operational amplifier can obtain a difference (represented by Uinverr below) between Uinvref and Uinv, and send the difference to the transmit end controller 101.

It may be understood that, the transmit end operational amplifier may be independently disposed or may be integrated into the transmit end controller 101. This is not limited in this application. In addition, the foregoing functions of the transmit end operational amplifier may be further implemented by software to save hardware costs, and the software may be run by the transmit end controller 101.

The transmit end controller 101 performs compensation control on the difference Uinverr to generate a modulation signal of the inverter H1, generates a drive signal of the inverter H1 through modulation, and drives a controllable switching transistor of the inverter H1 based on the drive signal.

Specifically, when the inverter H1 is a full bridge inverter, the transmit end controller may adjust duty cycles of drive signals of controllable switching transistors S1 to S4, adjust a phase-shift angle between two bridge arms, or adjust both a duty cycle of a drive signal of a controllable switching transistor and a phase-shift angle between two bridge arms.

In an example implementation, input currents of power converters corresponding to different loads may be determined in advance, and the correspondence is stored in a table. In a control process, a reference value of the input current of the power converter is determined based on a coefficient of coupling between a transmitter coil and a receiver coil and a load by using a table lookup method. Alternatively, a combination of the output voltage of the inverter and the reference value of the input current of the power converter may be determined in advance, where the combination can meet a requirement that the input current of the power converter is not overcurrent and charging efficiency is optimal (higher), and the combination is stored in a table. Therefore, in a control process, a reference value of the input current of the rectifier may be determined based on a coefficient of coupling between a transmitter coil and a receiver coil and a load by using a table lookup method, and an output voltage that is of the inverter and that corresponds to the reference value of the input current of the rectifier may be further determined by using a table lookup method.

In conclusion, a controller at the wireless charging receive end can obtain a reference signal of the output voltage of the inverter based on a result of comparison between the input current of the power converter at the receive end and the input reference current, and send the reference signal of the output voltage of the inverter to a transmit end controller, so that the transmit end controller controls the transmit end based on the reference signal of the output voltage of the inverter. Because the input current of the power converter at the receive end is controlled, the input current of the power converter at the receive end can be prevented from overcurrent, to protect the power converter at the receive end, and improve reliability of the wireless charging system. In addition, in actual application, the input reference current may be adjusted in real time based on a load status, so that the power converter can adapt to different working conditions. Therefore, an output response speed of the wireless charging system can be further improved.

Further, in an example implementation, the input current of the power converter at the receive end needs to be controlled not to overcurrent, and a charging parameter that is output by the power converter to a load further needs to be controlled to protect the load and improve wireless charging efficiency of the load. The charging parameter may be any one of a charging current, a charging voltage, and a charging power.

Descriptions are provided below by using an example in which the charging parameter is the charging voltage.

The receive end controller 202 may obtain an output voltage Vo of the power converter H2 by using a voltage sensor.

When receiving a charging instruction, the receive end controller 202 obtains an output reference voltage included in the charging instruction.

The charging instruction may be sent by a transmit end, or may be sent by a receive end. When the charging instruction is sent from the transmit end, the charging instruction may be an instruction delivered by the transmit end in response to a user operation. When the charging instruction is sent from the receive end, the charging instruction may be an instruction delivered by the receive end in response to a user operation, or an instruction delivered by a BMS connected to a load.

In a possible implementation, to obtain the difference Voerr, the receive end may further include a third operational amplifier, where a first input end of the third operational amplifier is connected to the output voltage Vo, a second input end of the third operational amplifier is connected to the output reference voltage, and an output end of the third operational amplifier is connected to the receive end controller 202.

The third operational amplifier can obtain the difference Voerr, and send the difference Voerr to the receive end controller 202.

It may be understood that the third operational amplifier may be independently disposed or may be integrated into the receive end controller 202. This is not limited in this application.

In another possible implementation, the foregoing functions of the third operational amplifier may be implemented by software to save hardware costs, and the software may be run by the receive end controller 202. To be specific, the receive end controller 202 can obtain the difference Voerr between Vo and the output reference voltage of the power converter H2.

The receive end controller 202 may perform compensation control on the difference Voerr to generate a modulation signal of the power converter H2, generate a drive signal of the power converter H2 through modulation, and drive a controllable switching transistor of the power converter H2 based on the drive signal.

Specifically, the receive end controller 202 may adjust a duty cycle of a drive signal of the power converter H2, adjust a phase-shift angle between two bridge arms, or adjust both a duty cycle of a drive signal of the power converter H2 and a phase-shift angle between two bridge arms, to control an output voltage of the power converter H2.

The output voltage of the power converter H2 is controlled to ensure that the load is not overvoltage, and in practice, the output voltage of the power converter H2 may be further controlled to be in an optimal operating range based on the output reference voltage, to improve charging efficiency of the load.

In conclusion, the wireless charging receive end provided in this embodiment of this application can not only prevent the input current of the power converter at the receive end from overcurrent, but also protect the load and improve wireless charging efficiency of the load based on a charging reference parameter and the charging parameter of the power converter, to further improve reliability of a wireless charging system.

Further, in an example implementation, a receiver coil current may be further controlled, to prevent a receiver coil from overcurrent, and improve reliability of the receiver coil. Descriptions are provided in detail below.

The receive end controller 202 may obtain a reference signal of a receiver coil current based on the difference Voerr between the output voltage Vo of the power converter H2 and the output reference voltage, obtain the drive signal of the controllable switching transistor of the power converter H2 based on a difference (represented by Iserr below) between the reference signal of the receiver coil current and a sampling current Is of a receiver coil, and drive the controllable switching transistor of the power converter H2 based on the drive signal.

The receive end controller 202 may obtain the sampling current Is of the receiver coil by using a current sensor.

In a possible implementation, to obtain the difference Iserr, the receive end may further include a fourth operational amplifier, where a first input end of the fourth operational amplifier is connected to the sampling current Is of the receiver coil, a second input end of the fourth operational amplifier is connected to the reference signal of the receiver coil current, and an output end of the fourth operational amplifier is connected to the receive end controller 202.

The fourth operational amplifier can obtain Iserr, and send the difference Iserr to the receive end controller 202.

It may be understood that, the fourth operational amplifier may be independently disposed or may be integrated into the receive end controller 202. This is not limited in this application.

In another possible implementation, the foregoing functions of the fourth operational amplifier may be implemented by software to save hardware costs, and the software may be run by the receive end controller 202. To be specific, the receive end controller 202 can obtain the difference Iserr between the reference signal of the receiver coil current and the sampling current Is of the receiver coil.

The receive end controller 202 may perform compensation control on Iserr to generate a modulation signal of the power converter H2, generate a drive signal of the power converter H2 through modulation, and drive a controllable switching transistor of the power converter H2 based on the drive signal, to adjust the receiver coil current.

Specifically, the receive end controller 202 may adjust a duty cycle of a drive signal of the power converter H2, adjust a phase-shift angle between two bridge arms, or adjust both a duty cycle of a drive signal of the power converter H2 and a phase-shift angle between two bridge arms, to adjust the receiver coil current.

In conclusion, because the receive end provided in embodiments of this application controls the receiver coil current, the receiver coil current can be prevented from overcurrent while an output power is ensured, to improve reliability of the receiver coil.

Further, when the power converter H2 uses the implementation shown in FIG. 7(*a*), the receive end controller may adjust duty cycles of drive signals of Q3 and Q4, to adjust the receiver coil current.

When the power converter H2 uses the implementation shown in FIG. 7(*b*), the receive end controller may adjust duty cycles of drive signals of Q1 and Q2, to adjust the receiver coil current.

When the power converter H2 uses the implementation shown in FIG. 7(c), the receive end controller may adjust a duty cycle of a drive signal of Q2, to adjust the receiver coil current.

When the power converter H2 uses the implementation shown in FIG. 7(d), the receive end controller may control a working status of the DC-DC circuit, to adjust the receiver coil current.

Specifically, for example, when the DC-DC circuit uses the implementation shown in FIG. 7(e), the receive end controller 202 may adjust a duty cycle of a drive signal of the switching transistor Qb, to adjust the receiver coil current.

When the power converter H2 uses the implementation shown in FIG. 7(f), the receive end controller may adjust duty cycles of drive signals of the switching transistors Q1 and Q2, to adjust the receiver coil current.

It may be understood that the inverter H1 may alternatively use any one of the implementations in FIG. 8(a) to FIG. 8(c), and the receive end compensation network may alternatively use any one of the implementations in corresponding descriptions of FIG. 9(a) to FIG. 9(c). Details are not described again.

Based on the wireless charging receive end provided in the foregoing embodiments, an embodiment of this application further provides a wireless charging system. Descriptions are provided in detail below with reference to the accompanying drawings.

System Embodiment

Figure 11:
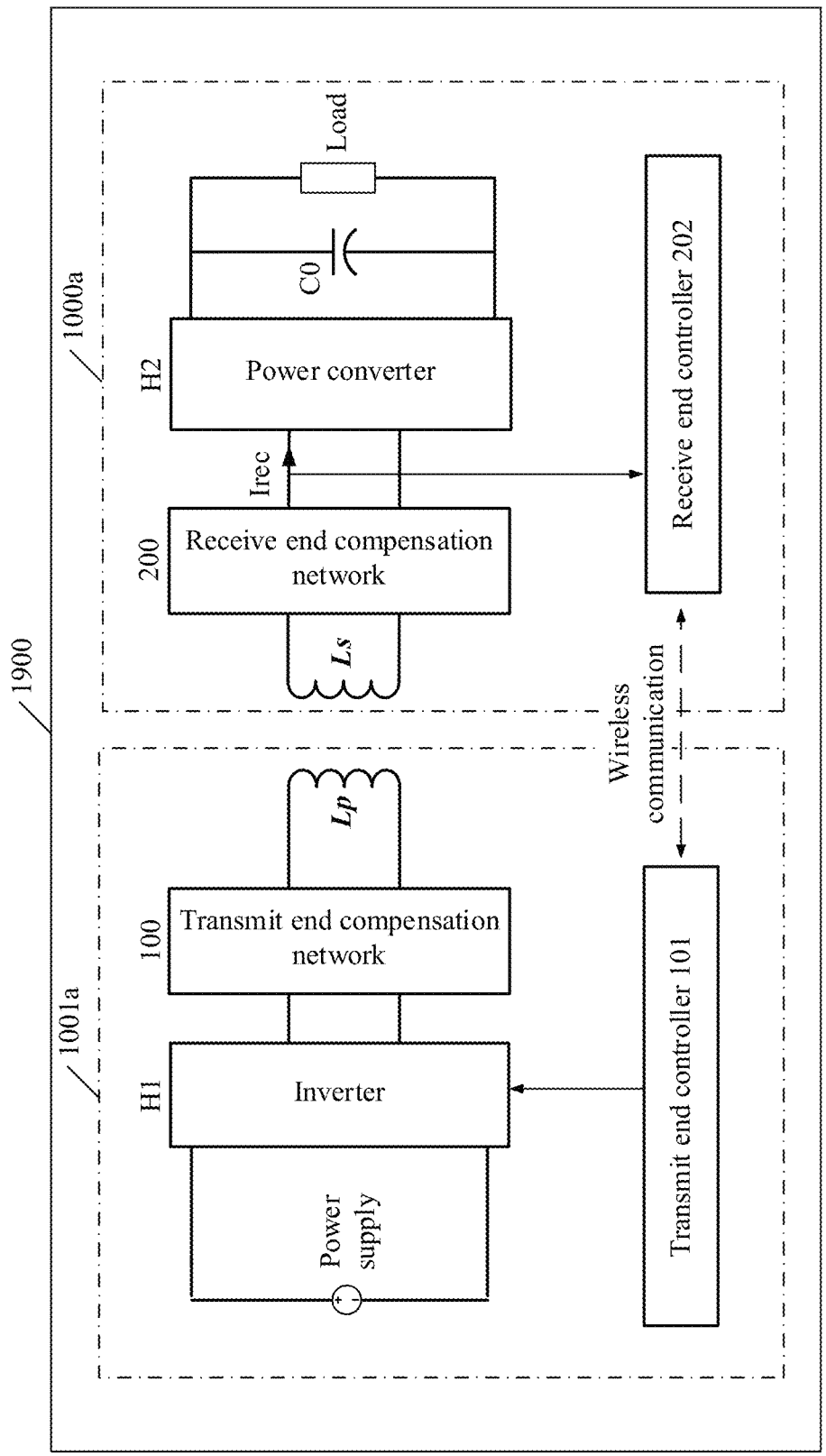
FIG. 11 is a schematic diagram of a wireless charging system according to an embodiment of this application.

FIG. 11 is a schematic diagram of a wireless charging system according to an embodiment of this application.

The wireless charging system 1100 includes a wireless charging receive end 1000a and a wireless charging transmit end 1001a.

The wireless charging receive end 1000a is configured to: receive an alternating magnetic field transmitted by the wireless charging transmit end 1001a, convert the alternating magnetic field into a direct current, and supply the direct current to a load. The wireless charging receive end 1000a includes a receiver coil Ls, a receive end compensation network 200, a power converter H2, and a receive end controller 202.

The receiver coil Ls converts the alternating magnetic field transmitted by the transmit end into an alternating current and transmits the alternating current to the receive end compensation network 200.

The receive end compensation network 200 compensates for the alternating current and then transmits a compensated alternating current to the power converter H2.

The power converter H2 rectifies the compensated alternating current into a direct current for charging the load.

The receive end controller 202 obtains a reference signal at the transmit end based on a result of comparison between an input current of the power converter and an input reference current, and sends the reference signal at the transmit end to a transmit end controller 101, so that the transmit end controller 101 controls the transmit end based on the reference signal at the transmit end.

The wireless charging transmit end 1001a includes an inverter H1, a transmitter coil Lp, a transmit end compensation network 100, and the transmit end controller 101.

The inverter H1 inverts a direct current that is output by a direct current power supply into an alternating current.

The transmit end compensation network 100 compensates for the alternating current and then transmits a compensated alternating current to the transmitter coil Lp.

The transmitter coil Lp transmits the compensated alternating current in a form of an alternating magnetic field.

The transmit end controller 101 receives a reference signal at a transmit end that is sent by a controller at the wireless charging receive end, and controls the transmit end based on the reference signal at the transmit end.

The reference signal at the transmit end may be a reference signal of a transmitter coil current or a reference signal of an output voltage of an inverter. The transmit end controller 101 may control the inverter H1 at the transmit end based on the reference signal at the transmit end.

The wireless charging system may be applied to the scenario shown in FIG. 2. To be specific, a load of the wireless charging receive end 1000a may be an electric vehicle, the wireless charging receive end 1000a may be located on the electric vehicle, and the wireless charging transmit end 1001a may be located at a wireless charging station.

The receive end controller in the wireless charging system provided in embodiments of this application can obtain the reference signal at the transmit end based on a comparison between the input current of the power converter and the input reference current, and send the reference signal at the transmit end to the transmit end controller, so that the transmit end controller controls the transmit end based on the reference signal at the transmit end. Because the input current of the power converter at the receive end is controlled, the input current of the power converter at the receive end can be prevented from overcurrent, to protect the power converter at the receive end, and improve reliability of the wireless charging system.

Further, the transmit end may further include a power factor correction circuit. An input end of the power factor correction circuit is connected to a power supply, and an output end of the power factor correction circuit is connected to the inverter. The power factor correction circuit is configured to adjust an input voltage of the inverter. When a voltage range that is output by the power factor correction circuit does not meet an adjustment range of an input voltage required by the inverter, a DC-DC circuit may be further added before the inverter to adjust the input voltage of the inverter.

Further, the receive end in the wireless charging system may alternatively be implemented in any implementation of Embodiment 2 or Embodiment 3. Details are not described herein again.

Because the receive end in the wireless charging system provided in Embodiment 3 further controls a receiver coil current, the receiver coil current can be prevented from becoming overcurrent while the output power is ensured, to improve reliability of a receiver coil.

Method Embodiment

Based on the wireless charging receive end provided in the foregoing embodiments, an embodiment of this application further provides a wireless charging receive end control method. Descriptions are provided in detail below with reference to the accompanying drawings.

Figure 12:
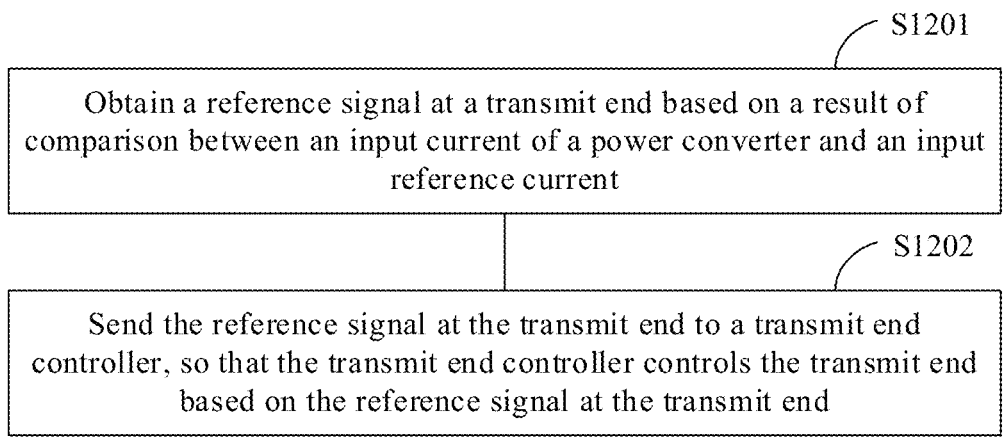
FIG. 12 is a flowchart of a wireless charging control method according to an embodiment of this application.

FIG. 12 is a flowchart of a wireless charging control method according to an embodiment of this application.

The control method provided in this embodiment of this application includes the following steps.

S1201: Obtain a reference signal at a transmit end based on a result of comparison between an input current of a power converter and an input reference current.

The input current of the power converter may be obtained by using a current sensor.

In a possible implementation, a fixed value may be used as the input reference current, to ensure that an input current of a rectifier does not exceed a maximum designed value of the input current of the power converter in all working conditions, to ensure that the input current of the power converter is never overcurrent.

In another possible implementation, an optimal value (or a relatively optimal value) of the input current of the power converter in various working conditions may be determined in advance and used as the input reference current, for example, an optimal (or relatively optimal) input reference current of a corresponding power converter in a same load, or an optimal (or relatively optimal) input reference current of a corresponding power converter in different loads when coefficients of coupling between a transmitter coil and a receiver coil are different. A basis for determining the input reference current may be ensuring that the input current of the power converter is not overcurrent and a requirement for charging efficiency at the receive end is met, that is, highest (or relatively high) charging efficiency is achieved.

S1202: Send the reference signal at the transmit end to a transmit end controller, so that the transmit end controller controls the transmit end based on the reference signal at the transmit end.

The following describes in detail the working principles of a transmit end controller and a receive end controller when the reference signal at the transmit end is a reference signal of a transmitter coil current.

In a possible implementation, to obtain a difference between the input current of the power converter and the input reference current, the receive end may further include a first operational amplifier, where a first input end of the first operational amplifier is connected to the input current of the power converter, a second input end of the first operational amplifier is connected to the input reference current, and an output end of the first operational amplifier is connected to the receive end controller.

The first operational amplifier can obtain the difference between the input current of the power converter and the input reference current, and send the difference to the receive end controller.

It may be understood that the first operational amplifier may be independently disposed or may be integrated into the receive end controller. This is not limited in this application.

In another possible implementation, the foregoing functions of the first operational amplifier may be implemented by software to save hardware costs, and the software may be run by the receive end controller. To be specific, the receive end controller can obtain the difference between the input current of the power converter and the input reference current.

The receive end controller performs compensation control on the obtained difference to generate a reference signal of a transmitter coil current.

The transmit end controller may sample the transmitter coil current by using a current sensor.

The transmit end may further include a transmit end operational amplifier, where a first input end of the transmit end operational amplifier is connected to the transmitter coil current, a second input end of the transmit end operational amplifier is connected to the reference signal of the transmitter coil current, and an output end of the transmit end operational amplifier is connected to the transmit end controller.

The transmit end operational amplifier can obtain a difference between the transmitter coil current and the reference signal of the transmitter coil current, and send the difference to the transmit end controller.

It may be understood that, the transmit end operational amplifier may be independently disposed or may be integrated into the transmit end controller. This is not limited in this application. In addition, the foregoing functions of the transmit end operational amplifier may be further implemented by software to save hardware costs, and the software may be run by the transmit end controller.

The transmit end controller performs compensation control on the difference to generate a modulation signal of an inverter, generates a drive signal of the inverter through modulation, and drives a controllable switching transistor of the inverter based on the drive signal.

For example, the inverter is a full bridge inverter. In this case, the transmit end controller may adjust a duty cycle of a drive signal of a controllable switching transistor, adjust a phase-shift angle between two bridge arms, or adjust both a duty cycle of a drive signal of a controllable switching transistor and a phase-shift angle between two bridge arms.

The following describes working principles that are of the transmit end controller and the receive end controller and that are used when the reference signal at the transmit end is a reference signal of an output voltage of the inverter.

The receive end controller may obtain the input current of the power converter by using a current sensor.

In a possible implementation, to obtain a difference between the input current and the input reference current, the receive end may further include a first operational amplifier, where a first input end of the first operational amplifier is connected to the input current of the power converter, a second input end of the first operational amplifier is connected to the input reference current, and an output end of the first operational amplifier is connected to the receive end controller.

The first operational amplifier can obtain the difference between the input current and the input reference current, and send the difference to the receive end controller.

It may be understood that, the first operational amplifier may be independently disposed or may be integrated into the receive end controller. This is not limited in this application.

In another possible implementation, the foregoing functions of the first operational amplifier may be implemented by software to save hardware costs, and the software may be run by the receive end controller.

The receive end controller performs compensation control on the obtained difference to generate a reference signal of an output voltage of an inverter, and sends the reference signal of the output voltage of the inverter to the transmit end controller.

The transmit end controller may sample the output voltage of the inverter by using a voltage sensor.

The transmit end may further include a transmit end operational amplifier, where a first input end of the transmit end operational amplifier is connected to the reference signal of the output voltage of the inverter, a second input end of the transmit end operational amplifier is connected to the output voltage, and an output end of the transmit end operational amplifier is connected to the transmit end controller.

The transmit end operational amplifier can obtain a difference between the reference signal of the output voltage of the inverter and the output voltage, and send the difference to the transmit end controller.

It may be understood that, the transmit end operational amplifier may be independently disposed or may be integrated into the transmit end controller. This is not limited in this application. In addition, the foregoing functions of the transmit end operational amplifier may be further implemented by software to save hardware costs, and the software may be run by the transmit end controller.

The transmit end controller 101 performs compensation control on the difference between the reference signal of the output voltage of the inverter and the output voltage to generate a modulation signal of an inverter, generates a drive signal of the inverter through modulation, and drives a controllable switching transistor of the inverter based on the drive signal.

For example, the inverter is a full bridge inverter. In this case, the transmit end controller may adjust a duty cycle of a drive signal of a controllable switching transistor, adjust a phase-shift angle between two bridge arms, or adjust both a duty cycle of a drive signal of a controllable switching transistor and a phase-shift angle between two bridge arms.

In conclusion, according to the method provided in an embodiment of this application, because the input current of the power converter at the receive end is controlled, the input current of the power converter at the receive end can be prevented from overcurrent, to protect the power converter at the receive end, and improve reliability of a wireless charging system. In addition, in actual application, the input reference current may be adjusted in real time based on a load status, so that the power converter can adapt to different working conditions. Therefore, an output response speed of a wireless charging system can be further improved.

A principle of controlling a charging parameter that is output by the power converter to a load to protect the load and improve wireless charging efficiency of the load is further described. The charging parameter may be any one of a charging current, a charging voltage, and a charging power.

Descriptions are provided below by using an example in which the charging parameter is the charging current. It may be understood that a control principle is similar to that used when the charging parameter is the charging voltage. When the charging parameter is the charging power, the charging power may be determined based on a product of the charging current and the charging voltage. Details are not described again.

The receive end controller may obtain an output current of the power converter by using a current sensor.

The receive end controller obtains a difference between an output current of the load and an output reference current.

In a possible implementation, to obtain the difference, the receive end may further include a second operational amplifier, where a first input end of the second operational amplifier is connected to the output current, a second input end of the second operational amplifier is connected to the output reference current, and an output end of the second operational amplifier is connected to the receive end controller.

The second operational amplifier can obtain the difference, and send the difference to the receive end controller.

It may be understood that the second operational amplifier may be independently disposed or may be integrated into the receive end controller. This is not limited in this application.

In another possible implementation, the foregoing functions of the second operational amplifier may be implemented by software to save hardware costs, and the software may be run by the receive end controller. To be specific, the receive end controller can obtain the difference between the output current and the output reference current of the power converter.

The receive end controller may perform compensation control on the difference to generate a modulation signal of the power converter, generate a drive signal of the power converter through modulation, and drive a controllable switching transistor of the power converter based on the drive signal.

According to the control method provided in some embodiments of this application, the wireless charging receive end can not only prevent the input current of the power converter at the receive end from overcurrent, but also protect the load and improve wireless charging efficiency of the load based on a charging reference parameter and the charging parameter of the power converter, to further improve reliability of a wireless charging system.

Further, a receiver coil current may be further controlled, to prevent a receiver coil from overcurrent, and improve reliability of the receiver coil. Descriptions are provided in detail below.

The receive end controller may obtain a reference signal of a receiver coil current based on the difference between the output voltage of the power converter and the output reference voltage, obtain the drive signal of the controllable switching transistor of the power converter based on a difference between the reference signal of the receiver coil current and a sampling current of a receiver coil, and drive the controllable switching transistor of the power converter based on the drive signal The receive end controller may obtain the sampling current of the receiver coil by using a current sensor.

In a possible implementation, to obtain the difference, the receive end may further include a fourth operational amplifier. A first input end of the fourth operational amplifier is connected to the sampling current of the receiver coil, a second input end of the fourth operational amplifier is connected to the reference signal of the receiver coil current, and an output end of the fourth operational amplifier is connected to the receive end controller.

The fourth operational amplifier can obtain the difference, and send the difference to the receive end controller.

It may be understood that the fourth operational amplifier may be independently disposed or may be integrated into the receive end controller. This is not limited in this application.

In another possible implementation, the foregoing functions of the fourth operational amplifier may be implemented by software to save hardware costs, and the software may be run by the receive end controller. To be specific, the receive end controller can obtain the difference between the reference signal of the receiver coil current and the sampling current of the receiver coil.

The receive end controller may perform compensation control on the difference of the output current to generate a modulation signal of the power converter, generate a drive signal of the power converter H2 through modulation, and drive a controllable switching transistor of the power converter based on the drive signal, to adjust the receiver coil current.

In conclusion, according to the control method provided in some embodiments of this application, because the receive end controls the receiver coil current, the receiver coil current can be prevented from overcurrent while an output power is ensured, to improve reliability of the receiver coil.

In some embodiments of this application, switching transistors of the inverter and the power converter each may be any one of the following: a relay, an insulated gate bipolar transistor (IGBT), a metal oxide semiconductor field effect transistor (MOSFET) (which is briefly referred to as a MOS transistor), a SiC MOSFET (silicon carbide metal oxide semiconductor field effect transistor), or the like. When the switching transistor is the MOS transistor, the switching transistor may be a PMOS transistor or an NMOS transistor. This is not limited in this application.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing descriptions are merely preferred embodiments of this application, and are not intended to limit this application in any form. Although the example embodiments of this application are disclosed above, embodiments are not intended to limit this application. By using the method and the technical content disclosed above, any person of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple amendments, equivalent variations, and modifications made on the above embodiments according to the technical essence of this application without departing from the content of the technical solutions of this application shall fall within the protection scope of the technical solutions of this application.

What is claimed is:

1. A wireless charging receive end device, comprising a receiver coil, a compensation network, a power converter, and a receive end controller, wherein
    the receiver coil is configured to: convert an alternating magnetic field transmitted by a transmit end device into an alternating current and transmit the alternating current to the compensation network;
    the compensation network is configured to: compensate for the alternating current and then transmit a compensated alternating current to the power converter;
    the power converter is configured to rectify the compensated alternating current into a direct current for charging a load; and
    the receive end controller is configured to: obtain a reference signal based on an input current of the power converter and an input reference current, and send the reference signal to a transmit end controller, so that the transmit end controller controls the transmit end device based on the reference signal.

2. The receive end device according to claim 1, wherein the receive end controller is configured to: obtain a reference signal of a transmitter coil current based on a difference between the input current of the power converter and the input reference current, and send the reference signal of the transmitter coil current to the transmit end controller, so that the transmit end controller controls an inverter at the transmit end device based on the reference signal of the transmitter coil current.

3. The receive end device according to claim 1, wherein the receive end controller is configured to: obtain a reference signal of an output voltage of an inverter based on a difference between the input current of the power converter and the input reference current, and send the reference signal of the output voltage of the inverter to the transmit end controller, so that the transmit end controller controls the inverter at the transmit end device based on the reference signal of the output voltage of the inverter.

4. The receive end device according to claim 2, wherein the receive end controller is further configured to obtain the difference between the input current of the power converter and the input reference current.

5. The receive end device according to claim 2, further comprising a first operational amplifier, wherein
    a first input end of the first operational amplifier is connected to the input current of the power converter, a second input end of the first operational amplifier is connected to the input reference current, and an output end of the first operational amplifier is connected to the receive end controller; and
    the first operational amplifier is configured to: obtain the difference between the input current of the power converter and the input reference current, and send the difference to the receive end controller.

6. The receive end device according to claim 2, wherein the receive end controller is further configured to: obtain a drive signal of a controllable switching transistor of the power converter based on a comparison between a charging parameter of the load and a charging reference parameter, and drive the controllable switching transistor of the power converter based on the drive signal, wherein the charging parameter is one of the following: a charging current, a charging voltage, or a charging power.

7. The receive end device according to claim 6, wherein when the charging parameter is the charging current, the receive end controller is configured to: obtain the drive signal of the controllable switching transistor of the power converter based on a difference between an output current of the power converter and an output reference current, and drive the controllable switching transistor of the power converter based on the drive signal.

8. The receive end device according to claim 6, wherein the receive end controller is further configured to obtain a difference between an output current of the power converter and an output reference current.

9. The receive end device according to claim 6, further comprising a second operational amplifier, wherein
    a first input end of the second operational amplifier is connected to an output current of the power converter, a second input end of the second operational amplifier is connected to an output reference current, and an output end of the second operational amplifier is connected to the receive end controller; and
    the second operational amplifier is configured to: obtain a difference between the output current of the power converter and the output reference current, and send the difference to the receive end controller.

10. The receive end device according to claim 6, wherein the receive end controller is configured to: obtain a reference signal of a receiver coil current based on a difference between an output voltage of the power converter and an output reference voltage, obtain the drive signal of the controllable switching transistor of the power converter based on a difference between the reference signal of the receiver coil current and a sampling current of a receiver coil, and drive the controllable switching transistor of the power converter based on the drive signal.

11. The receive end device according to claim 1, wherein the power converter comprises a rectifier;
an input end of the rectifier is connected to an output end of the compensation network, and an output end of the rectifier is connected to the load; and
the rectifier is a full bridge rectifier or a half bridge rectifier comprising a controllable switching transistor.

12. The receive end device according to claim 1, wherein the power converter comprises a rectifier and a DC-DC circuit;
an input end of the rectifier is connected to an output end of the compensation network, an output end of the rectifier is connected to an input end of the DC-DC circuit, and an output end of the DC-DC circuit is connected to the load; and
switching transistors in the rectifier are diodes, and the DC-DC circuit comprises a controllable switching transistor.

13. A wireless charging system, comprising a transmit end device and a receive end device, wherein the transmit end device comprises an inverter, a transmit end compensation network, a transmitter coil, and a transmit end controller;
the inverter is configured to: invert a direct current into an alternating current and transmit the alternating current to the transmit end compensation network;
the transmit end compensation network is configured to: compensate for the alternating current and then transmit a compensated alternating current to the transmitter coil;
the transmitter coil is configured to transmit the compensated alternating current in a form of an alternating magnetic field; and
the transmit end controller is configured to: receive a reference signal at a transmit end device that is sent by a receive end controller, and control the transmit end device based on the reference signal at the transmit end device;
wherein the receive end device comprises a receiver coil, a compensation network, a power converter, and a receive end controller, wherein
the receiver coil is configured to: convert an alternating magnetic field transmitted by the transmit end device into an alternating current and transmit the alternating current to the compensation network;
the compensation network is configured to: compensate for the alternating current and then transmit a compensated alternating current to the power converter;
the power converter is configured to rectify the compensated alternating current into a direct current for charging a load; and
the receive end controller is configured to: obtain a reference signal based on an input current of the power converter and an input reference current, and send the reference signal to a transmit end controller, so that the transmit end controller controls the transmit end device based on the reference signal at the transmit end device.

14. The system according to claim 13, wherein the reference signal at the transmit end device is a reference signal of a transmitter coil current; and
the transmit end controller is configured to control the inverter based on the reference signal of the transmitter coil current.

15. The system according to claim 13, wherein the reference signal is a reference signal of an output voltage of the inverter; and
the transmit end controller is configured to control the inverter based on the reference signal of the output voltage of the inverter.

16. A wireless charging control method, applied to a wireless charging receive end device, wherein the method comprises:
obtaining a reference signal based on a comparison between an input current of a power converter and an input reference current; and
sending the reference signal to a transmit end controller, so that the transmit end controller controls the transmit end device based on the reference signal.

17. The control method according to claim 16, wherein the reference signal is a reference signal of a transmitter coil current; and the method comprises:
obtaining the reference signal of the transmitter coil current based on a difference between the input current of the power converter and the input reference current; and
sending the reference signal of the transmitter coil current to the transmit end controller, so that the transmit end controller controls an inverter at the transmit end device based on the reference signal of the transmitter coil current.

18. The control method according to claim 16, wherein the reference signal at the transmit end device is a reference signal of an output voltage of an inverter; and the method comprises:
obtaining the reference signal of the output voltage of the inverter at the transmit end device based on a difference between the input current of the power converter and the input reference current; and
sending the reference signal of the output voltage of the inverter to the transmit end controller, so that the transmit end controller controls the inverter at the transmit end device based on the reference signal of the output voltage of the inverter.

19. An electric vehicle, comprising a receive end device, a vehicle communications module, an energy storage module, and a drive module, wherein the receive end device provides the energy storage module with electric energy required for energy storage, the energy storage module further provides the drive module with electric energy for driving a vehicle, and the vehicle communications module is configured to communicate with a transmit end device matching the receive end device,
wherein the receive end device comprises a receiver coil, a compensation network, a power converter, and a receive end controller, wherein
the receiver coil is configured to: convert an alternating magnetic field transmitted by a transmit end device into an alternating current and transmit the alternating current to the compensation network;
the compensation network is configured to: compensate for the alternating current and then transmit a compensated alternating current to the power converter;
the power converter is configured to rectify the compensated alternating current into a direct current for charging a load; and
the receive end controller is configured to: obtain a reference signal based on an input current of the power converter and an input reference current, and send the reference signal to a transmit end controller, so that the transmit end controller controls the transmit end device based on the reference signal.

20. A wireless charging transmit end device, comprising an inverter, a transmit end compensation network, a transmitter coil, and a transmit end controller, wherein
- the inverter is configured to: invert a direct current into an alternating current and transmit the alternating current to the transmit end compensation network;
- the transmit end compensation network is configured to: compensate for the alternating current and then transmit a compensated alternating current to the transmitter coil;
- the transmitter coil is configured to transmit the compensated alternating current in a form of an alternating magnetic field; and
- the transmit end controller is configured to: receive a reference signal at the transmit end device that is sent by a wireless charging receive end device, and control the transmit end device based on the reference signal, wherein the reference signal is a reference signal obtained by the receive end device based on an input current of a power converter at the receive end device and an input reference current.

* * * * *